(12) United States Patent
Turner et al.

(10) Patent No.: US 10,640,295 B1
(45) Date of Patent: May 5, 2020

(54) CONVEYOR ASSEMBLY INCLUDING ADJUSTABLE LANE GUIDE ELEMENTS

(71) Applicant: Septimatech Group Inc., Waterloo (CA)

(72) Inventors: Daniel John Turner, Kitchener (CA); Jeffrey Christopher Dodge, Guelph (CA)

(73) Assignee: Septimatech Group Inc., Waterloo, Ontario (CA)

( * ) Notice: Subject to any disclaimer, the term of this patent is extended or adjusted under 35 U.S.C. 154(b) by 0 days.

(21) Appl. No.: 16/405,372

(22) Filed: May 7, 2019

Related U.S. Application Data

(60) Provisional application No. 62/669,130, filed on May 9, 2018.

(51) Int. Cl.
*B65G 21/20* (2006.01)

(52) U.S. Cl.
CPC .. *B65G 21/2072* (2013.01); *B65G 2201/0235* (2013.01)

(58) Field of Classification Search
CPC ............................ B65G 21/20; B65G 21/2072
USPC ...................... 198/836.1, 836.2, 836.3, 836.4
See application file for complete search history.

(56) References Cited

U.S. PATENT DOCUMENTS

| | | | |
|---|---|---|---|
| 5,211,280 A | 5/1993 | Houde | |
| 5,515,668 A | 5/1996 | Hunt et al. | |
| 5,676,239 A * | 10/1997 | Mason | B65G 21/2072 198/836.1 |
| 6,050,396 A | 4/2000 | Moore | |
| 6,209,707 B1 | 4/2001 | Ronchi | |
| 6,360,880 B1 * | 3/2002 | Ouellette | B65G 51/035 198/626.1 |
| 6,378,695 B1 * | 4/2002 | Rinne | B65G 21/2072 198/836.3 |
| 6,612,785 B1 * | 9/2003 | Ouellette | B65G 51/035 198/836.3 |
| 7,207,428 B2 * | 4/2007 | Huttner | B65G 21/2072 198/444 |
| 7,530,453 B2 * | 5/2009 | Ingraham | B65G 21/2072 198/817 |
| 7,607,531 B2 * | 10/2009 | Bonhomme | B65G 21/2072 198/442 |
| 8,025,141 B1 * | 9/2011 | Bouldin | B26D 1/11 198/343.1 |
| 8,464,864 B2 | 6/2013 | Bell et al. | |
| 8,490,780 B2 | 7/2013 | Bell et al. | |
| 8,695,787 B2 | 4/2014 | Bell et al. | |

(Continued)

*Primary Examiner* — Douglas A Hess

(57) ABSTRACT

A conveyor assembly having a conveyor for moving containers in a preselected direction. The conveyor assembly includes one or more lane guide elements, for at least partially defining one or more lanes along which the containers are movable by the conveyor. Each lane has a lane width that is transverse to the preselected direction. The conveyor assembly also includes one or more point subassemblies, connected with the lane guide elements, and one or more point subassembly cross-members on which the point subassemblies are mounted. The point subassembly is transversely movable on one or the point subassembly cross-members relative to the preselected direction, to move the lane guide element to which it is attached, to adjust the lane width of the lane defined thereby.

14 Claims, 22 Drawing Sheets

(56) References Cited

U.S. PATENT DOCUMENTS

| | | | |
|---|---|---|---|
| 8,752,697 B2 * | 6/2014 | Dercks | B65G 21/2072 |
| | | | 198/454 |
| 8,931,631 B2 * | 1/2015 | Vasse | B65G 21/2072 |
| | | | 198/836.1 |
| 9,309,017 B2 * | 4/2016 | Langen | B65B 5/024 |
| 9,481,524 B2 | 11/2016 | Bell et al. | |
| 9,884,733 B1 * | 2/2018 | Pawelski | B65G 51/035 |
| 10,351,355 B2 * | 7/2019 | Toyli | B65G 21/2072 |
| 2016/0122132 A1 | 5/2016 | Bell et al. | |

\* cited by examiner

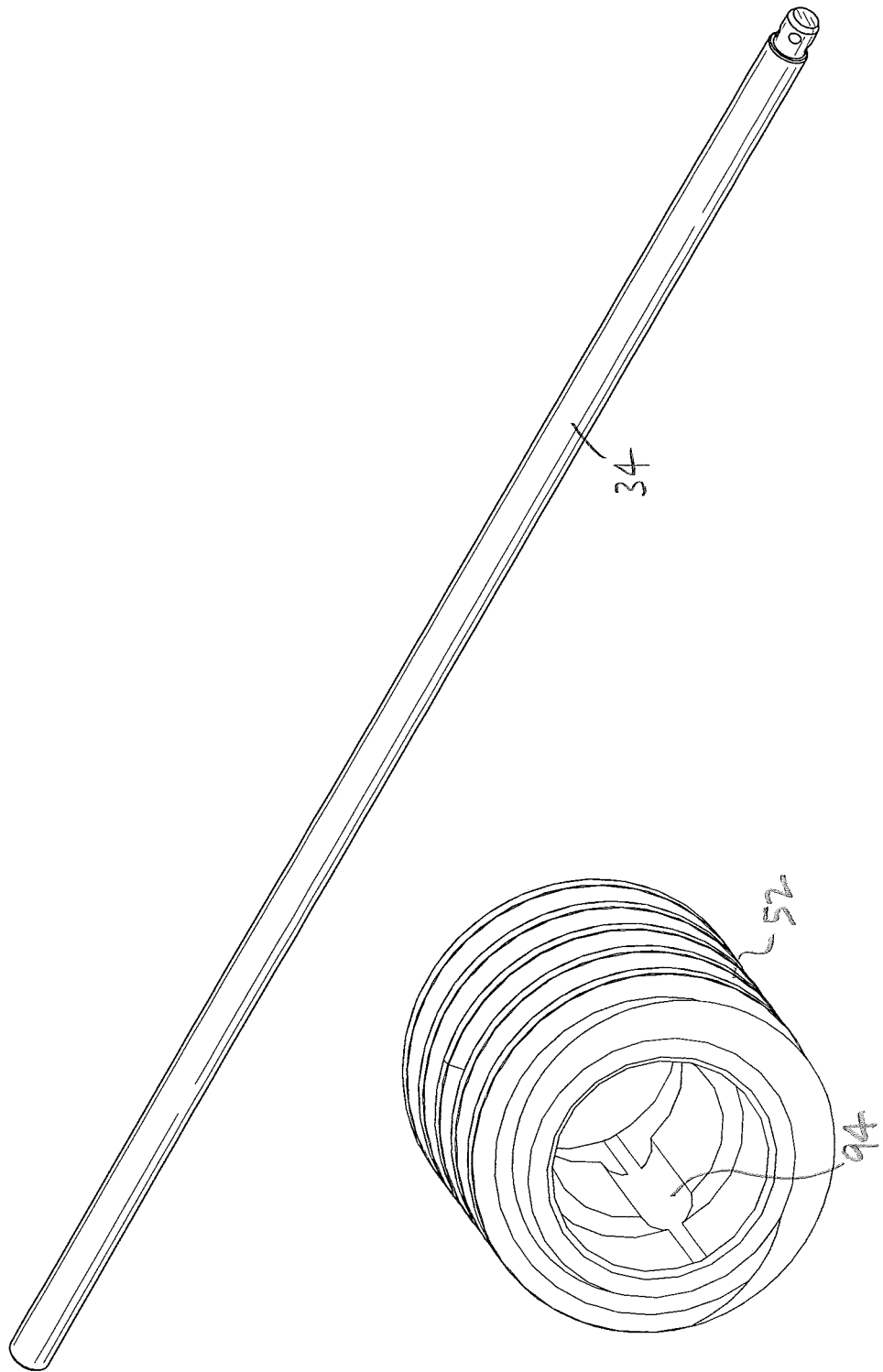

CONVEYOR ASSEMBLY INCLUDING ADJUSTABLE LANE GUIDE ELEMENTS

CROSS-REFERENCE TO RELATED APPLICATION

This application claims the benefit of U.S. Provisional Patent Application No. 62/669,130, filed on May 9, 2018, the entirety of which is hereby incorporated by reference.

FIELD OF THE INVENTION

The present invention is a conveyor assembly including adjustable lane guide elements for guiding containers moved by a conveyor.

BACKGROUND OF THE INVENTION

Conveyor systems used in manufacturing packaging goods often include guides that define lanes into which articles on a conveyor are directed. The articles may be, for instance, packaged goods or containers, e.g., bottles or other containers into which a product has been placed, or is to be placed. Depending on the circumstances, the guides forming the lanes may be used at one or more different points in the packaging process. As is well known in the art, the guides are positioned precisely relative to the conveyor, in order that the lanes are the precise optimum width for the containers. Because the conveyors typically move the containers at relatively high speed, an inaccurately positioned guide may cause the conveyors to jam, resulting in lost production.

For example, where filled bottles are to be positioned in two groups of three on each side of a carton, lanes may be configured to position filled and capped bottles into two separate lines in which the bottles are arranged in single file respectively, so that the bottles may conveniently be packaged in the cartons. In this example, once the filled bottles are in two parallel single files, they can relatively easily be positioned in the respective cartons by a packaging machine.

As is well known in the art, the positions of the guides defining the lanes typically are required to be changed from time to time, when the shapes and/or sizes of the containers are changed. Also, other parameters (e.g., the cartons or other packaging in which the filled containers are positioned) may also change from time to time, and the lane guides may need to be repositioned accordingly.

However, in the prior art, the mechanisms and methods for adjusting the positions of the guides are generally labor-intensive, and also typically are somewhat inaccurate. The lack of accuracy in positioning the guides can, and sometimes does, result in the containers that are conveyed becoming jammed, requiring that the conveyor be stopped to clear away the jammed materials.

SUMMARY OF THE INVENTION

There is a need for a conveyor assembly including adjustable lane guide elements that overcomes or mitigates one or more of the disadvantages or defects of the prior art. Such disadvantages or defects are not necessarily included in those listed above.

In its broad aspect, the invention provides a conveyor assembly having a conveyor for moving containers in a preselected direction. The conveyor assembly includes one or more lane guide elements, for at least partially defining one or more lanes along which the containers are movable by the conveyor. Each lane has a lane width that is transverse to the preselected direction. The conveyor assembly also includes one or more point subassemblies, connected with the lane guide elements, and one or more point subassembly cross-members on which the point subassemblies are mounted. The point subassembly is transversely movable on the point subassembly cross-member on which it is mounted relative to the preselected direction, to move the lane guide element to adjust the lane width of the lane defined thereby.

In another of its aspects, the invention provides a method of adjusting lane widths of one or more lanes that are at least partially defined by one or more lane guide elements. The lane is sized to guide a container moved by a conveyor in a preselected direction along the lanes. The method includes providing one or more point subassemblies, each connected with one of the lane guide elements. One or more point subassembly cross-members are provided, on which the point subassemblies are mounted. The point subassemblies are each moved transversely, on the point subassembly cross-member on which they are mounted, relative to the preselected direction, to move the lane guide element connected therewith transversely a predetermined distance.

In another of its aspects, the invention provides a lane adjustment system for guiding containers moved by a conveyor in a preselected direction in one or more lanes. Each lane has a lane width that is transverse to the preselected direction. The lane adjustment system includes a number of point subassembly cross-members positioned at least partially transverse to the preselected direction and spaced apart from each other in the preselected direction along said at least one conveyor, and one or more lane guide elements, to at least partially define the lanes. Each lane guide element has a predetermined length. The lane adjustment system includes a number of point subassemblies connected to the lane guide elements, for locating each of the lane guide elements in a predetermined position therefor relative to the conveyor. The point subassemblies secured to a selected one of the lane guide elements constitute a lane guide element group. The lane adjustment system also includes one or more drive elements, each drive element being rotatable about a drive element axis thereof, and one or more adjustor cross-members rotatable about a cross-member axis thereof. Each adjustor cross-member is located transverse to the preselected direction. The system also includes one or more lane guide adjustor subassemblies for changing the lane width of the lanes. Each lane guide adjustor subassembly is mounted on one of the adjustor cross-members. Each lane guide adjustor assembly is connected with the point subassemblies of a selected one of the lane guide element groups by one of the drive elements. The lane guide adjustor subassembly includes an adjustor gear train configured to translate rotation of the adjustor cross-member to which the gear train is partially attached to corresponding rotation of a drive element to which the gear train is operatively connected. The point subassemblies are mounted on the point subassembly cross-members respectively, and each said point subassembly cross-member includes a rack element. The drive element includes a drive element body, and a number of pinion gears mounted on the drive element body, for meshable engagement of each of the pinion gears with the respective rack elements on the point subassembly cross-members. Rotation of an adjustor cross-member about the cross-member axis thereof causes corresponding rotation of the drive element connected thereto via the adjustor gear train of the lane guide adjustor subassembly mounted thereon. Such movement causes corresponding transverse movement of the point subassemblies of the lane guide element group, for moving the lane guide element thereof to adjust the lane width of the lane that is at least partially defined thereby.

BRIEF DESCRIPTION OF THE DRAWINGS

The invention will be better understood with reference to the attached drawings in which:

FIG. 3D is another isometric view of the worm of FIG. 3B;

FIG. 3E is an isometric view of an embodiment of the adjustor cross-member of the invention, drawn at a smaller scale;

DETAILED DESCRIPTION

Figure 1A:
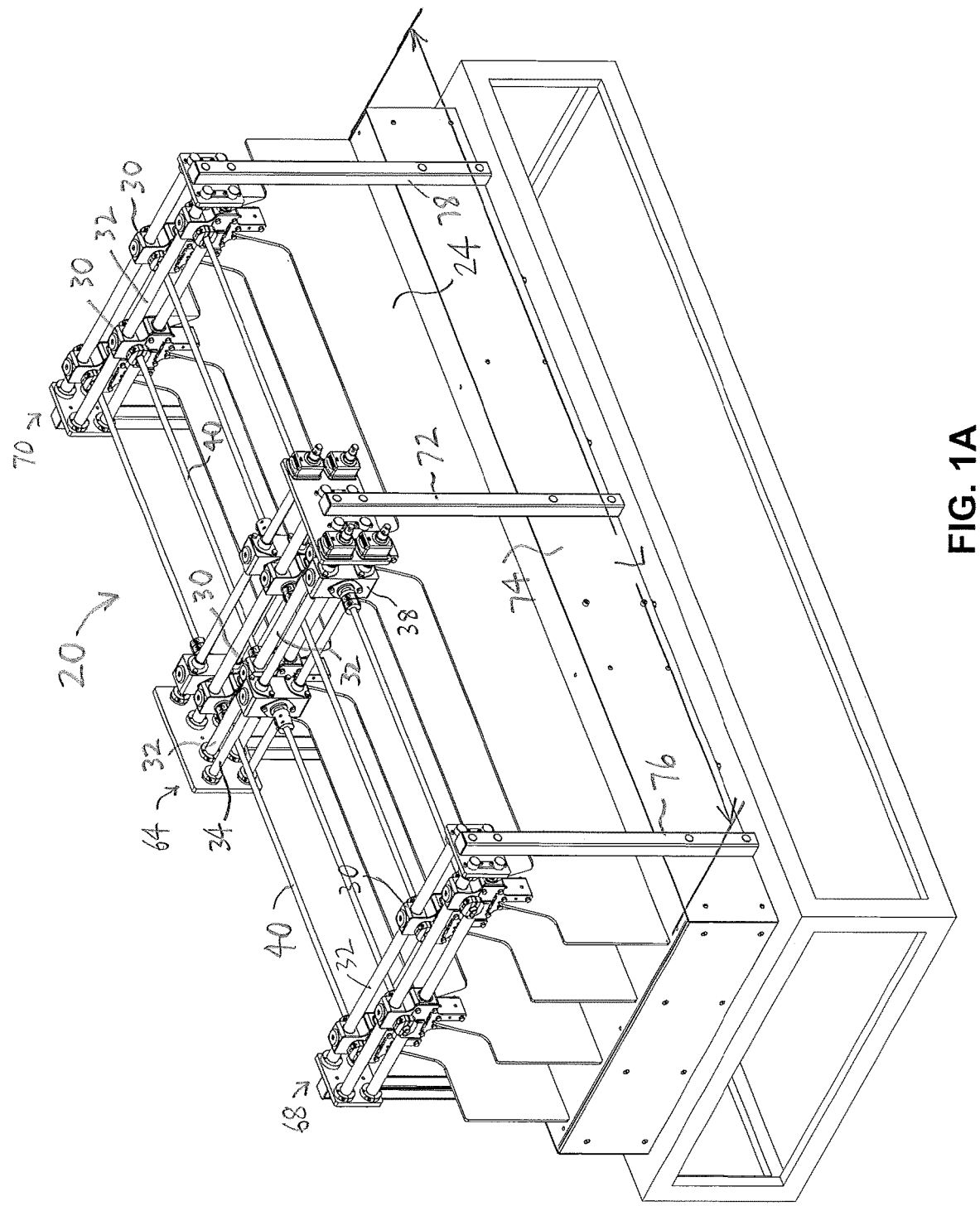
FIG. 1A is an isometric view of an embodiment of a conveyor assembly of the invention in which certain elements thereof are arranged into a first end unit, a central unit, and a second end unit.

In the attached drawings, like reference numerals designate corresponding elements throughout. Reference is made to FIGS. 1A-4E to describe an embodiment of a conveyor assembly of the invention indicated generally by the numeral 20. In one embodiment, the conveyor assembly 20 preferably includes a conveyor 21 for moving containers 22 in a preselected direction (FIG. 1B). The preselected direction is indicated by arrow "A" in FIG. 1B. Preferably, the conveyor assembly 20 includes one or more lane guide elements 24, for at least partially defining one or more lanes 26 along which the containers 22 are movable by the conveyor 21. As will be described, each of the lanes 26 preferably has a lane width 28 (FIG. 1C) that is transverse to the preselected direction. It is also preferred that the conveyor assembly 20 includes one or more point subassemblies 30, connected with the one or more lane guide elements 24. The conveyor assembly 20 preferably also includes one or more point subassembly cross-members 32 on which the one or more point subassemblies 30 are mounted. Each of the point subassemblies 30 preferably is transversely movable on the point subassembly cross-member 32 relative to the preselected direction, to move the lane guide element 24 connected to the point subassembly 30 for adjusting the lane width 28 of the lane 26 that is partially defined by the lane guide element 24.

Figure 1B:
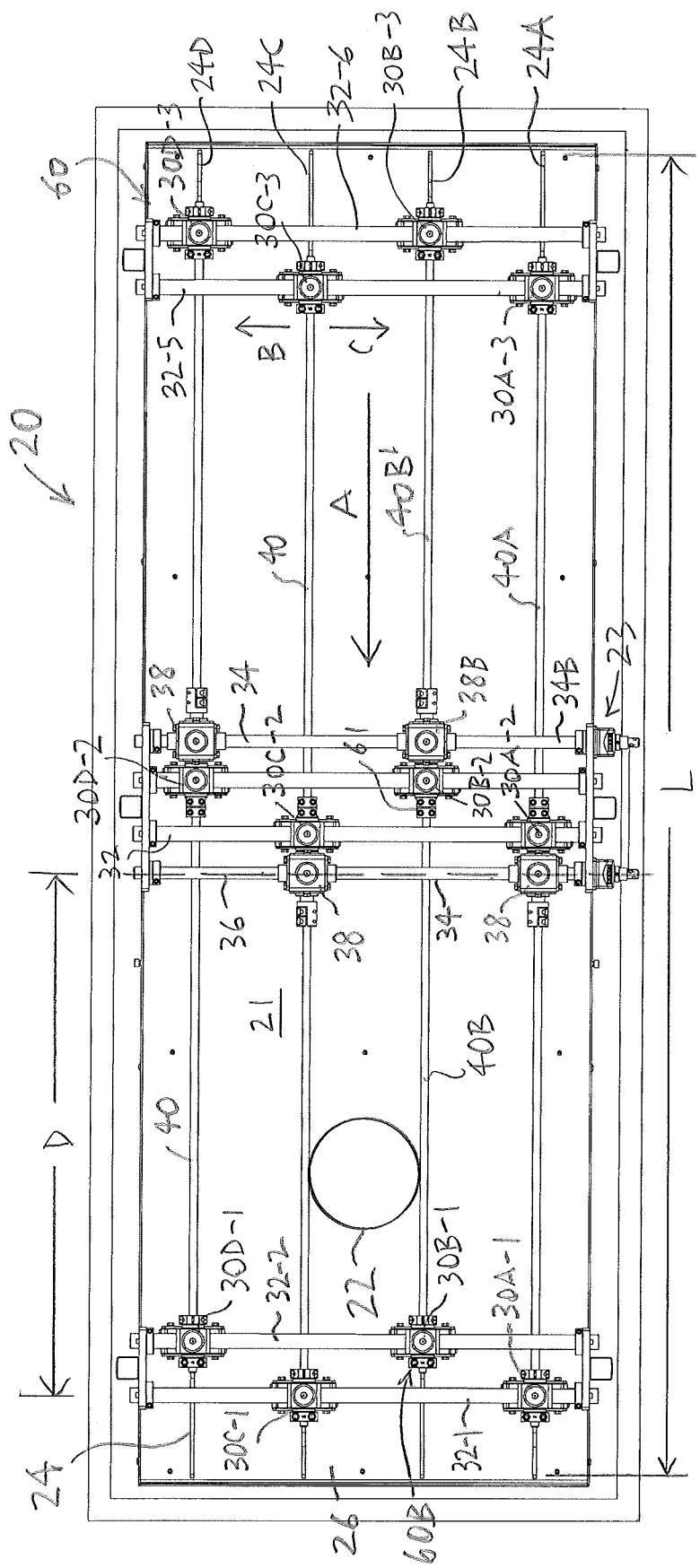
FIG. 1B is a top view of the conveyor assembly of FIG. 1A.
Figure 1C:
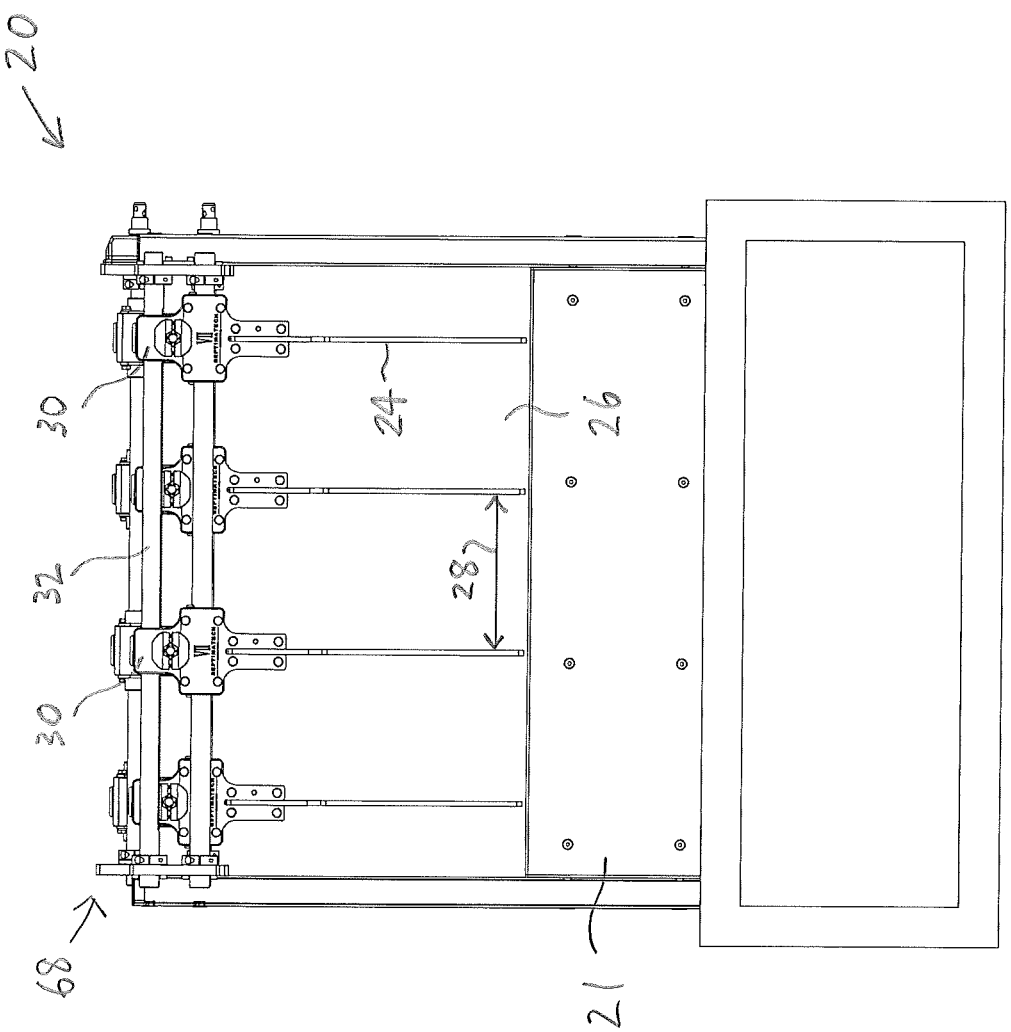
FIG. 1C is an end view of the conveyor assembly of FIG. 1A.

An example of one embodiment of the conveyor assembly 20 is illustrated in FIGS. 1A-1C. For exemplary purposes, the conveyor assembly 20 is illustrated as having four lane guide elements 24, and each of the lane guide elements has the same predetermined length "L". As can be seen in FIGS. 1A-1C, each of the lane guide elements 24 preferably is suspended from several of the point subassemblies 30. As will be described, the point subassembly 30 preferably includes a point subassembly body 31 that is configured to be secured to the lane guide element 24. Each of the point subassemblies 30 is mounted on a selected one of the point subassembly cross-members 32. As will be described, the point subassemblies 30 that are supporting a selected one of the lane guide elements are transversely movable together (i.e., at substantially the same time, and substantially the same distance) along the point subassembly cross-member 32 on which the point subassemblies are mounted respectively. The point subassembly cross-members 32 are located transverse to the preselected direction. Accordingly, the only directions in which any of the point subassemblies 30 can move is transverse (i.e., substantially orthogonal) to the preselected direction. The possible directions of movement of the point subassemblies 30 are indicated by arrows "B" and "C" in FIG. 1B.

As illustrated in FIG. 1B, when the lane widths 28 are to be amended in order to accommodate a different container, the lane guide elements preferably are positioned so that the container 22 may easily pass between the lane guide elements 24. Those skilled in the art would appreciate that the lane width 28 preferably is only slightly larger than a width "W" of the container 22 (FIG. 1B). As is well known in the art, if the lane width 28 is too wide or too narrow, the containers 22 may not pass smoothly along the lanes 26, which has undesirable consequences, e.g., the containers "jamming", requiring the conveyor 21 to stop. Accordingly, for the container 22 having a width "W", there is an ideal, or predetermined lane width 28, which is neither too large nor too small. The lane width 28 defined by the lane guide elements 24 for a particular container 22 is the predetermined lane width, i.e., a distance that is neither too narrow nor too large. Because the containers 22 are moved relatively quickly by the conveyor 21, even a small deviation from the predetermined lane width can result in the containers jamming.

Those skilled in the art would also appreciate that, if the lane width 28 is set as the predetermined lane width for the container 22, the containers 22 will bump against and otherwise occasionally engage the lane guide elements 24 as the containers 22 move along the lane 26 defined thereby, urging the lane guide elements apart.

From the foregoing, it can be seen that the lane guide elements 24 must be accurately positioned when they are moved to define a new predetermined lane width. However, in addition, and as will be described, it is desirable that, once the lane guide elements 24 are positioned to define the predetermined lane width, the lane guide elements 24 are firmly held in such positions, and resist the urging thereof apart by the containers 22 that engage the lane guide elements 24.

As can be seen, e.g., in FIG. 1B, it is also preferred that the point subassembly 30 is movable on the point subassembly cross-member 32 orthogonally to the preselected direction, i.e., in the directions indicated by arrows "B" and "C".

Figure 2A:
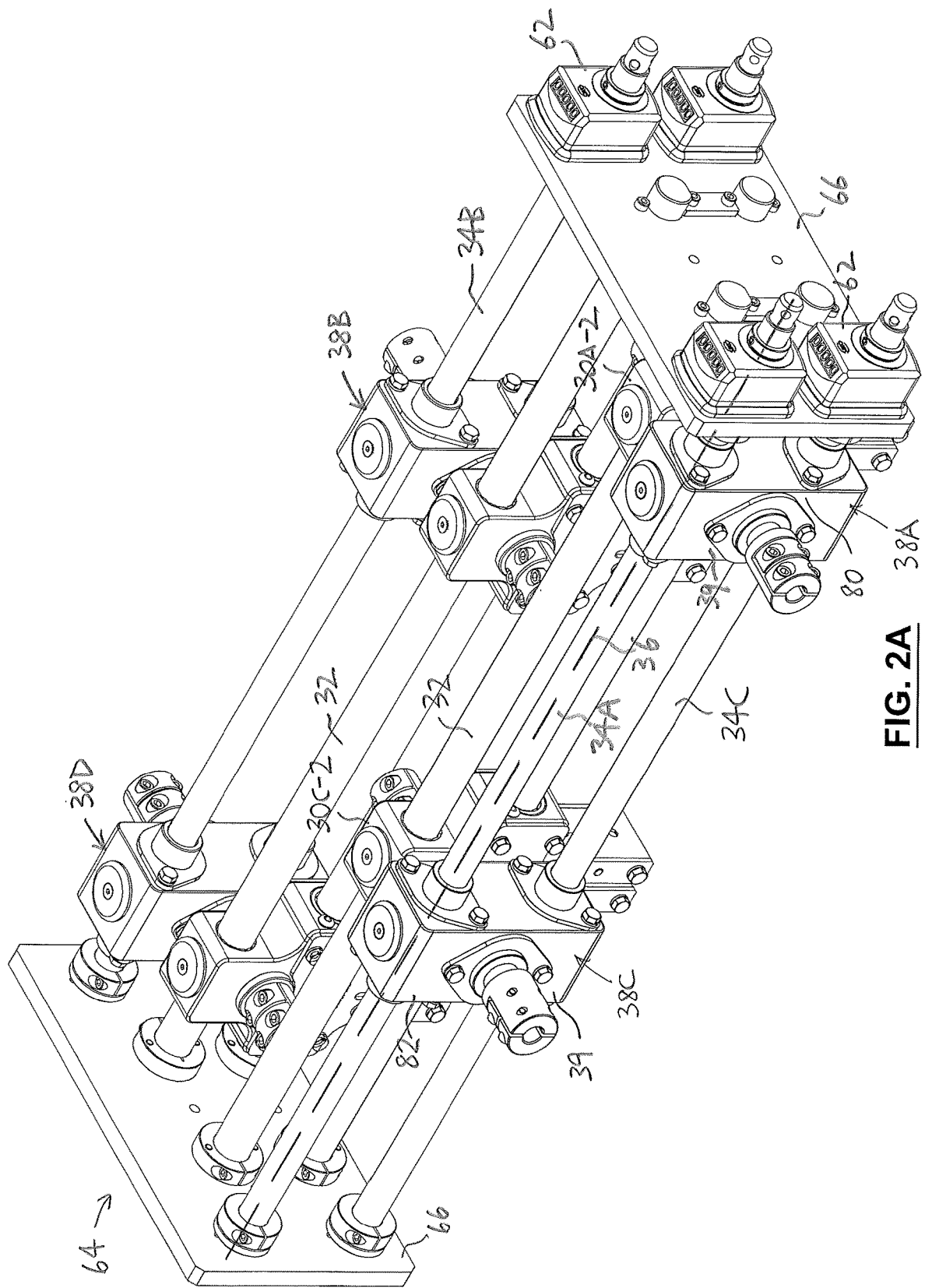
FIG. 2A is an isometric view of the central unit of the conveyor assembly of FIGS. 1A-1D, drawn at a larger scale.
Figure 2B:
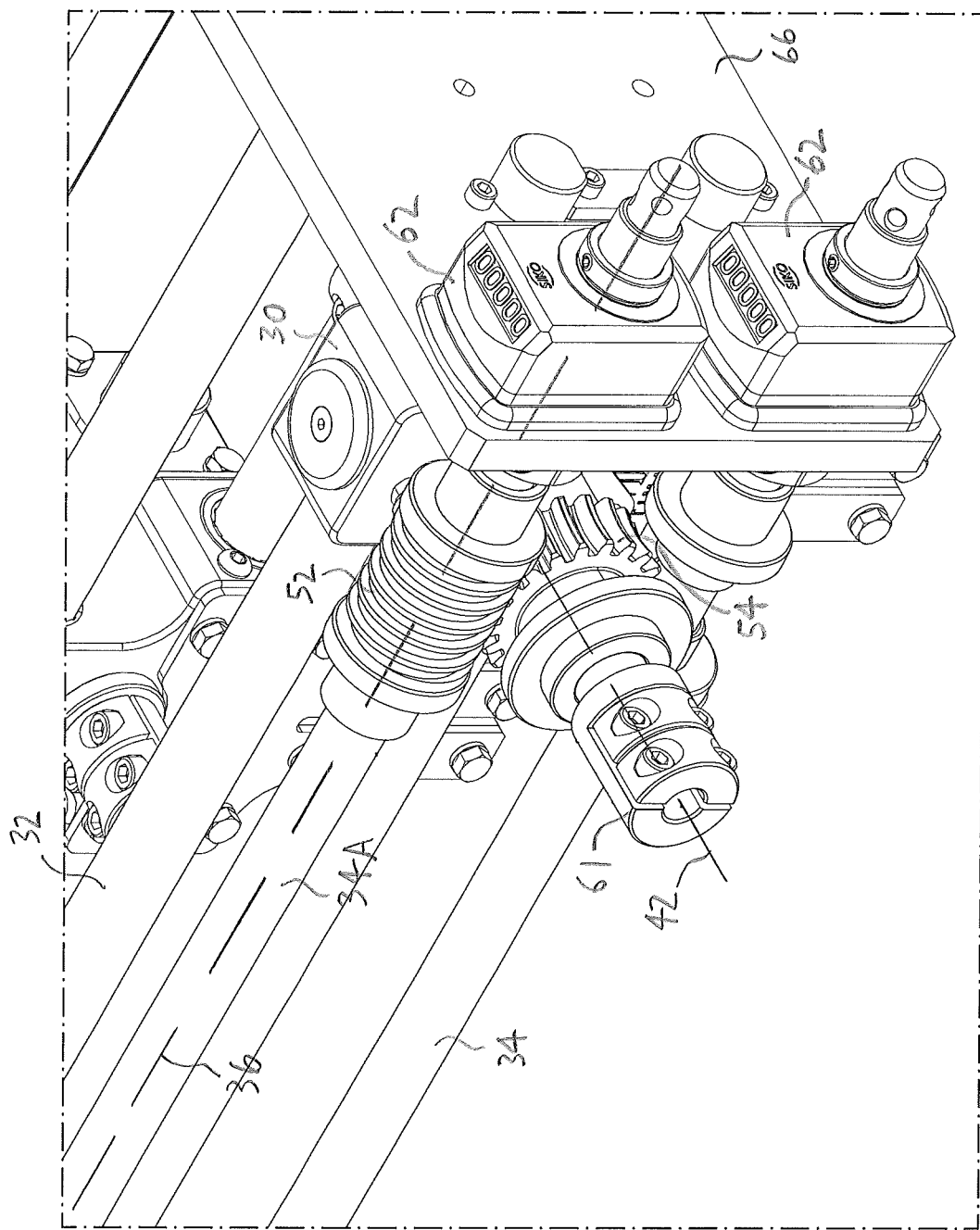
FIG. 2B is an isometric view of an embodiment of an adjustor gear train of the invention, drawn at a larger scale.

In one embodiment, the conveyor assembly 20 preferably additionally includes one or more adjustor cross-members 34 (FIGS. 1A, 1B, 2A), each of the adjustor cross-members 34 being rotatable about an adjustor cross-member axis 36 thereof, and one or more lane guide adjustor subassemblies 38, mounted on the adjustor cross-members 34 respectively, as will be described (FIG. 2A). As will also be described, the lane guide adjustor subassembly 38 preferably includes a lane guide adjustor subassembly housing 39. Preferably, and as can be seen, e.g., in FIGS. 1A and 1B, the conveyor assembly 20 also includes one or more drive elements 40. One or more of the drive elements 40 connect the lane guide adjustor subassembly 38 with one or more point subassemblies 30. The drive element 40 preferably is rotatable about a drive element axis 42 thereof (FIGS. 2B, 3A).

Figure 3A:
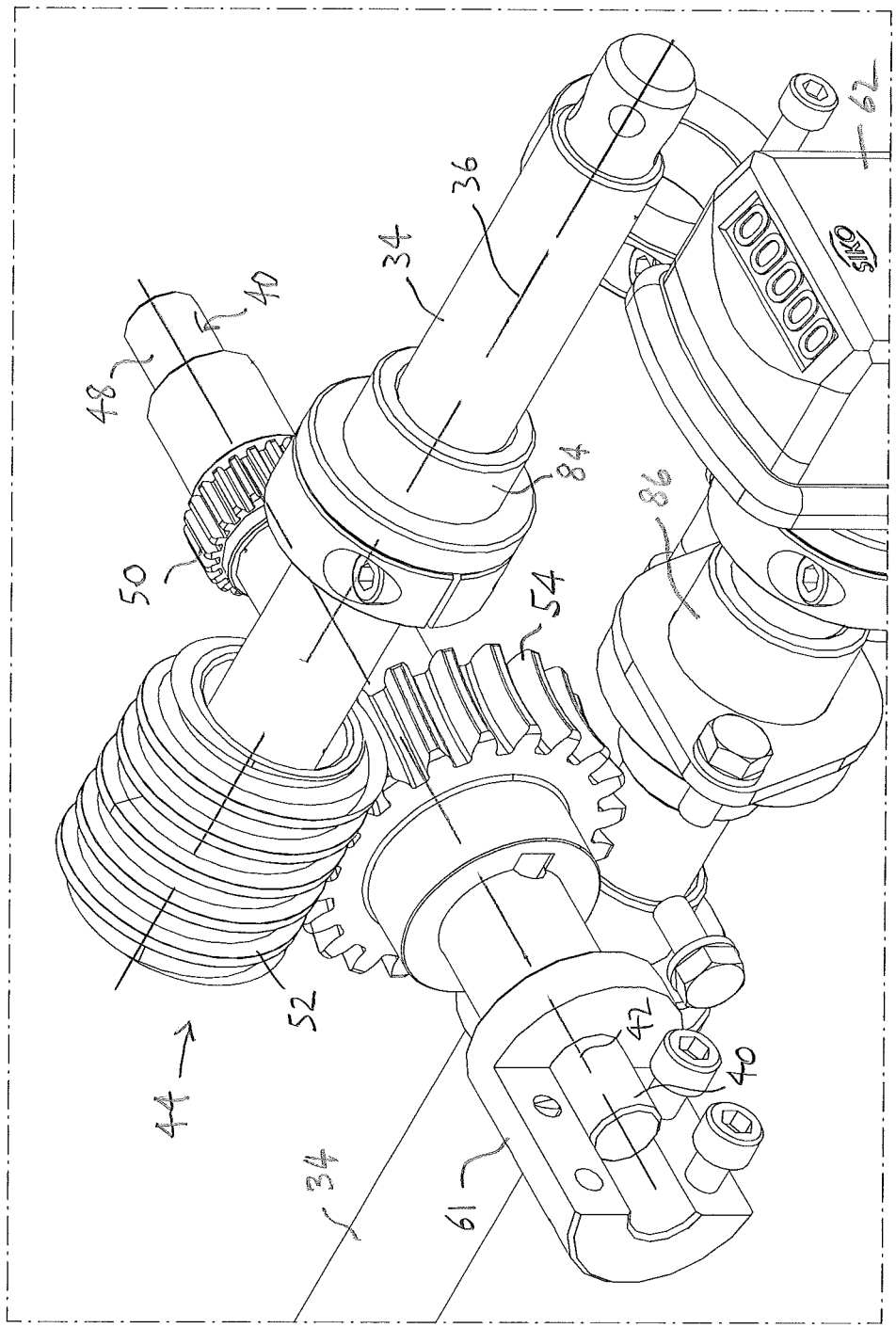
FIG. 3A is another isometric view of the adjustor gear train of FIG. 2B, showing a worm thereof mounted on the adjustor cross-member and a worm gear thereof mounted on a drive element, drawn at a larger scale.
Figure 3C:
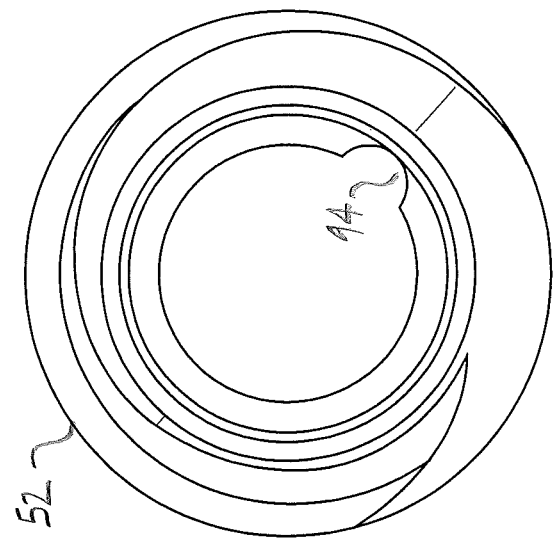
FIG. 3C is an end view of the worm of FIG. 3B.
Figure 3B:
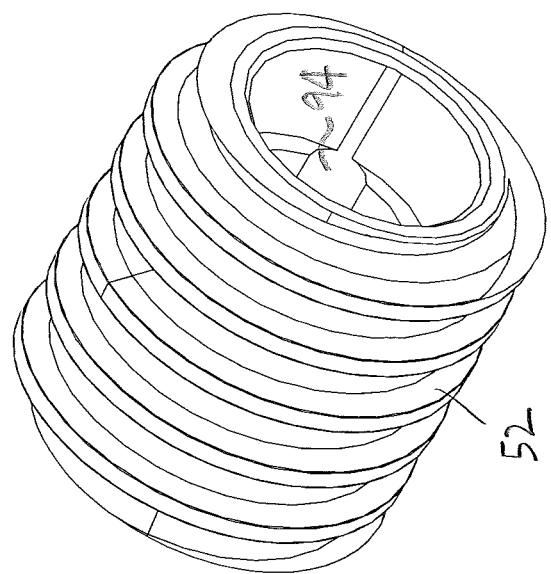
FIG. 3B is an isometric view of the worm of FIG. 3A, drawn at a larger scale.

It is also preferred that the lane guide adjustor subassembly 38 includes an adjustor gear train 44 that is configured to translate rotation of the adjustor cross-member 34 about the adjustor cross-member axis 36 into rotation of the drive element 40 about the drive element axis 42 (FIG. 3A). The adjustor gear train 44 is described in more detail below.

The drive element 40 preferably is partially located inside a body 45 of the point subassembly 30, and the body 45 is also secured to the lane guide element 24 (FIGS. 2C, 2E, 2F, 2G, 2H). Preferably, the point subassembly 30 is transversely movable on the point subassembly cross-member 32 (as indicated by arrows "B" and "C" in FIG. 1B), to adjust the lane width 28 of the lane 26, in response to rotation of the drive element 40 about the drive element axis 42.

It will be understood that the embodiments of the conveyor assembly 20 that are shown in the drawings are exemplary only. It will also be understood that certain elements are omitted from certain views, for clarity of illustration. For instance, in FIGS. 1A-1C, the four lane guide elements 24 define three lanes 26 therebetween. Those skilled in the art would appreciate that any suitable number of lane guide elements 24 may be included in the conveyor assembly 20.

Figure 2C:
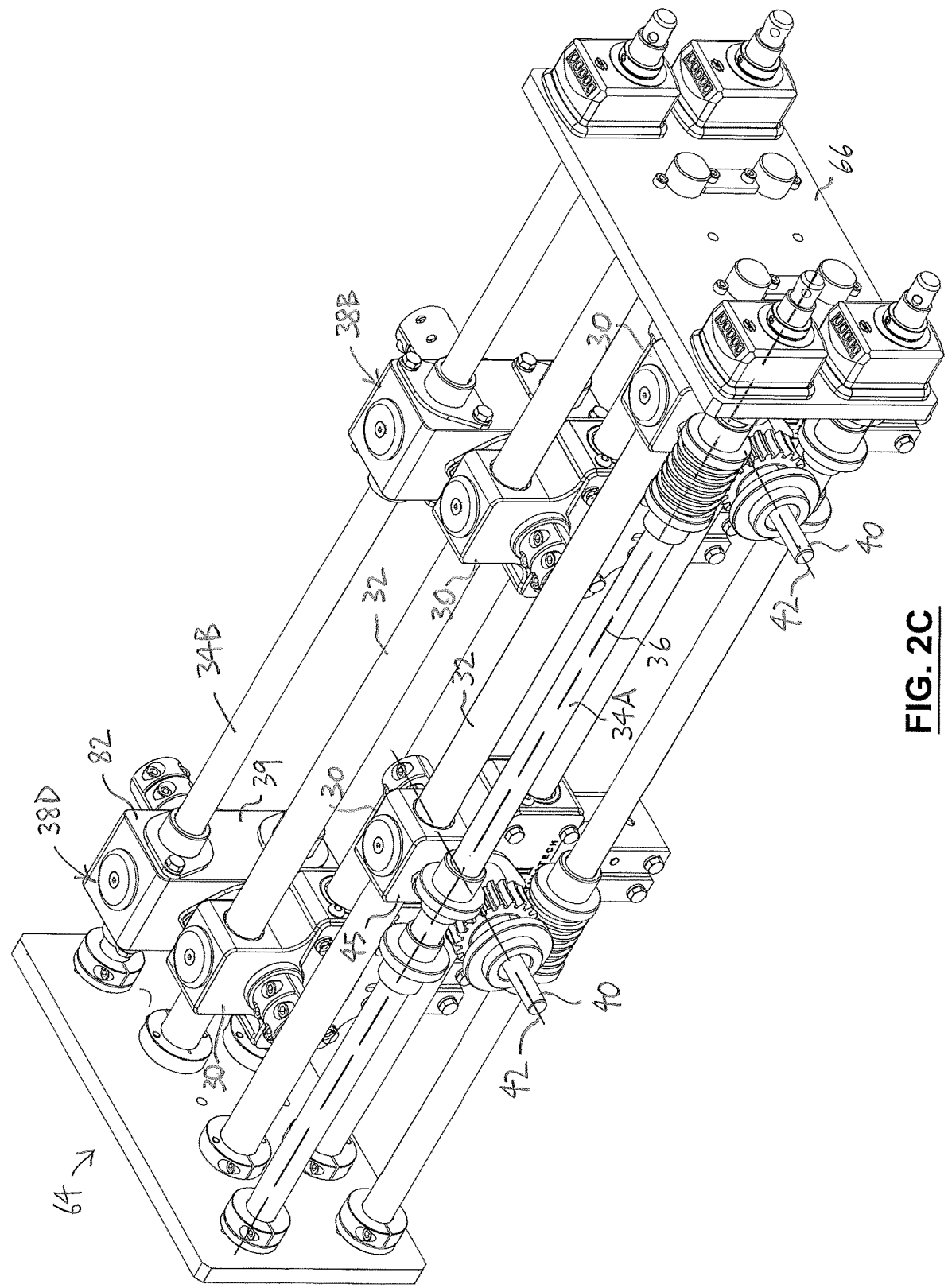
FIG. 2C is an isometric view of two adjustor gear trains of the central unit arranged on adjustor cross-members in the central unit, drawn at a smaller scale.
Figure 2D:
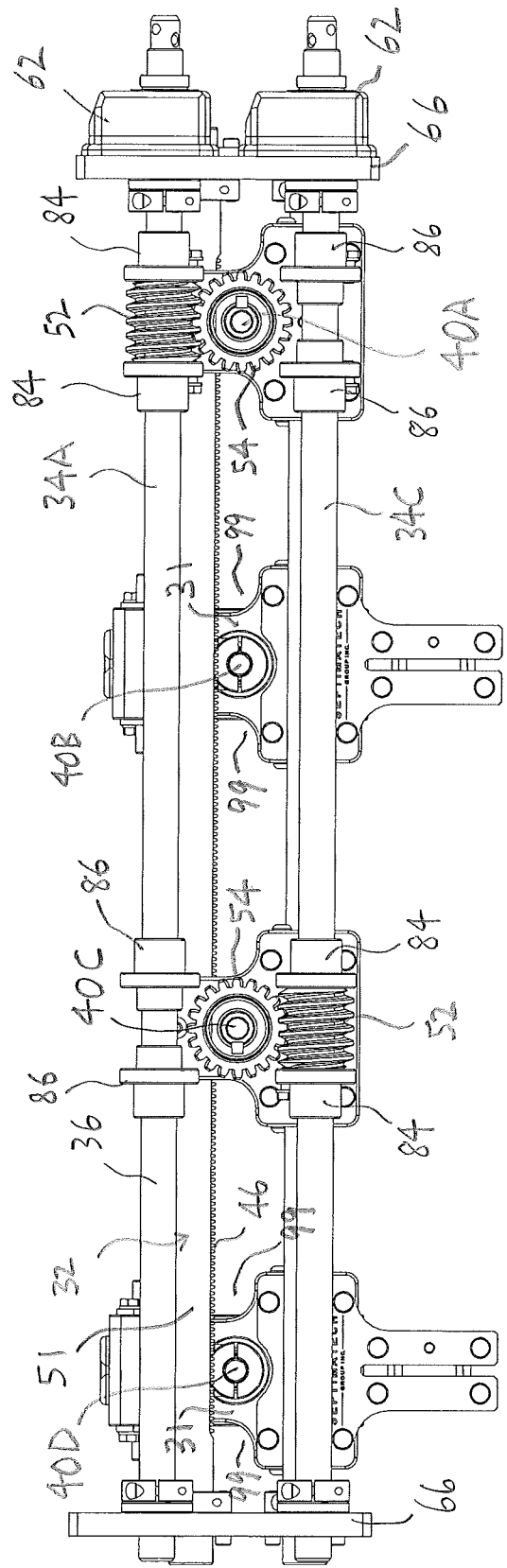
FIG. 2D is a front view of the arrangement of the two adjustor gear trains of FIG. 2C.
Figure 2E:
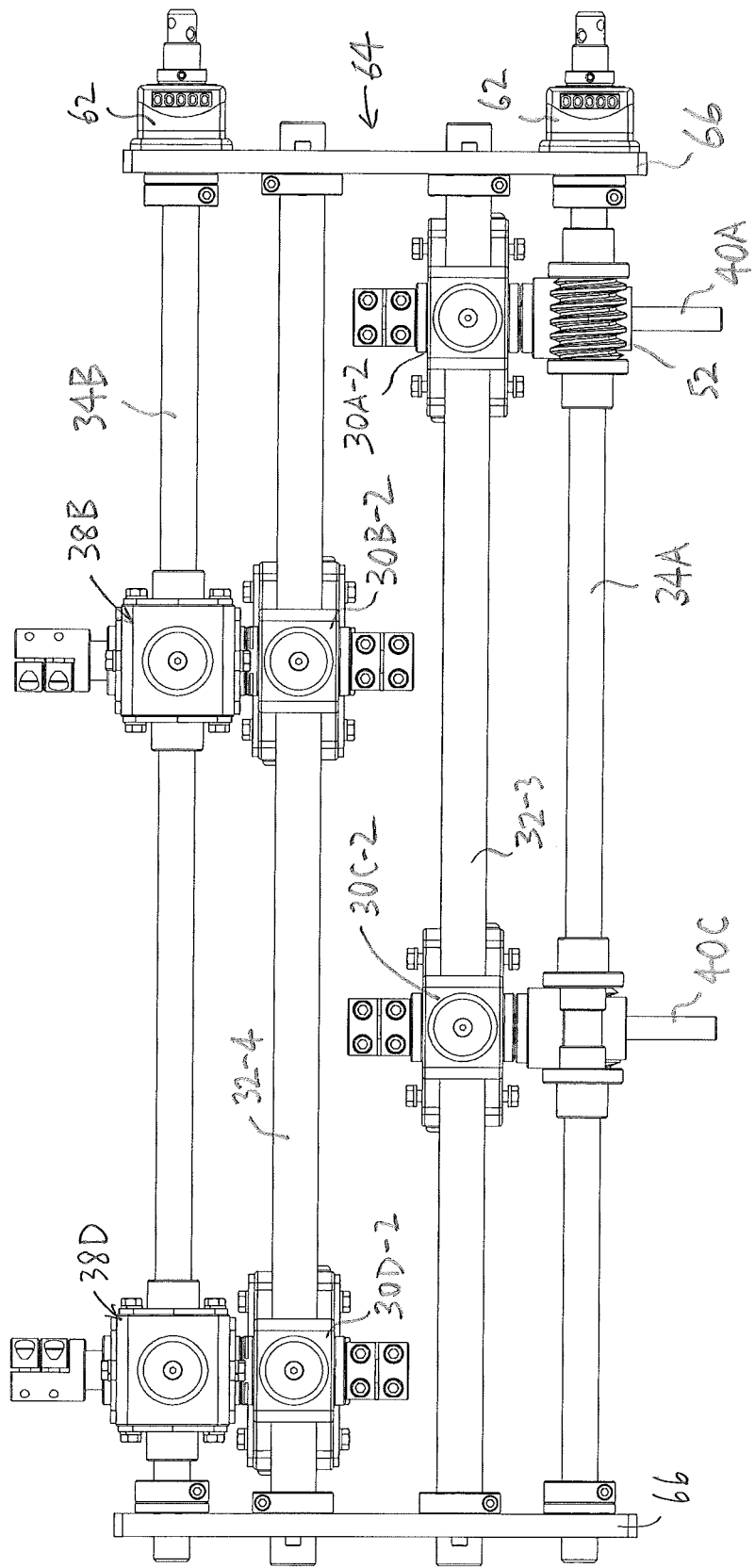
FIG. 2E is a top view of the arrangement of the two adjustor gear trains of FIGS. 2C and 2D, showing two point subassemblies connected therewith respectively.
Figure 2F:
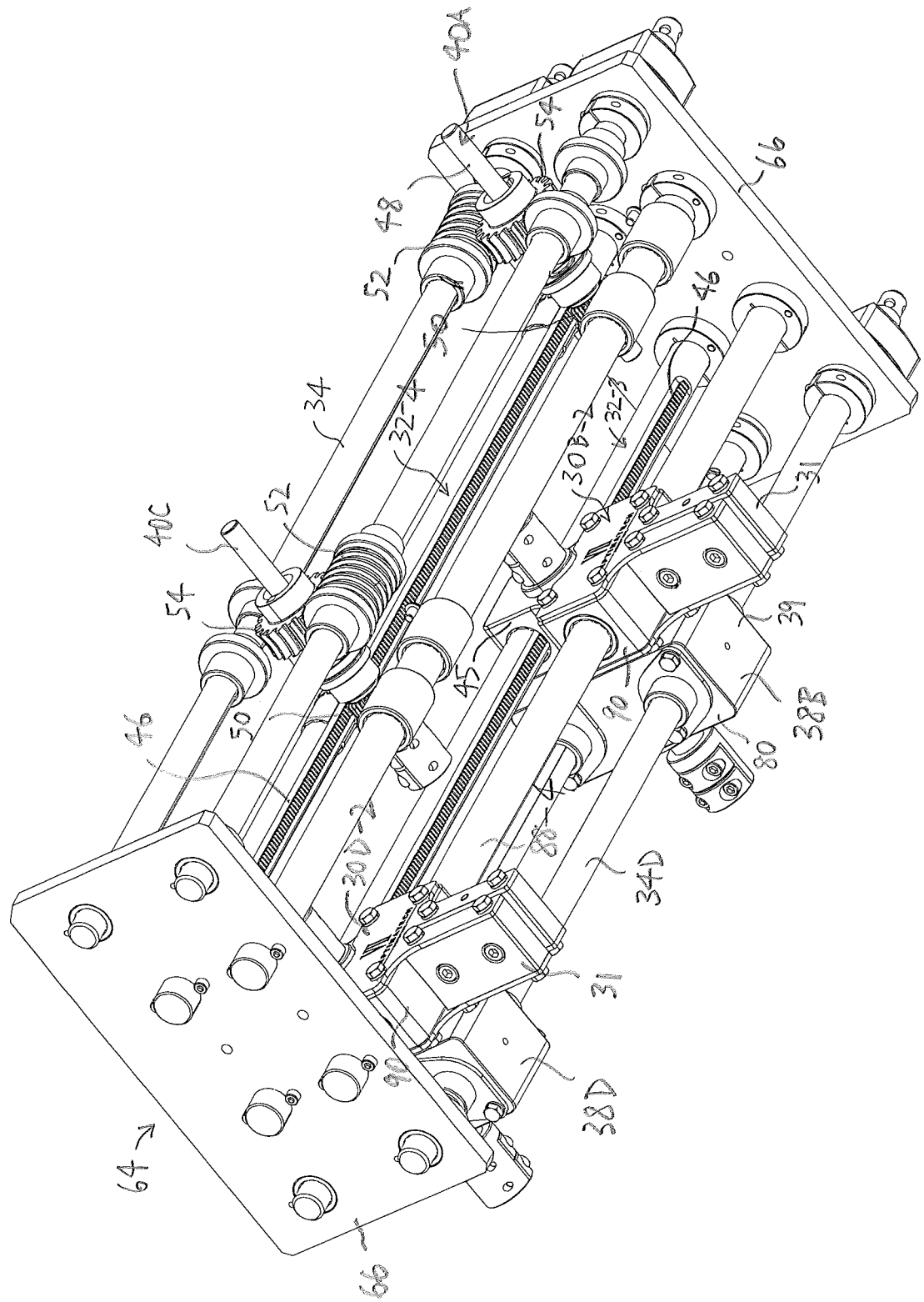
FIG. 2F is an isometric view of the arrangement of the two adjustor gear trains of FIGS. 2C-2E, showing a rack element on a point subassembly cross-member on which point subassemblies are mounted.

In one embodiment, the point subassembly cross-member 32 preferably includes a rack element 46 (FIGS. 2D, 2F). Preferably, the drive element 40 includes one or more drive element bodies 48, and one or more pinion gears 50 mounted on the drive element body 48 (FIGS. 2F, 3A). The pinion gear 50 preferably is adapted for meshable engagement with the rack element 46. Rotation of the drive element body 48 about the drive element axis 42 causes corresponding rotation of the pinion gear 50 about the drive element axis 42, to move the point subassembly 30 along the point subassembly cross-member 32, for corresponding transverse movement of the lane guide element 24 to adjust the lane width 28 of the lane 26.

The point subassembly cross-member 32, and the rack element 46 thereof, may have any suitable configuration. In one embodiment, the point subassembly cross-member 32 preferably includes a point subassembly body 51, and the rack element 46 preferably is secured to a bottom side of the point subassembly cross-member body 51.

Those skilled in the art would appreciate that the adjustor gear train 44 may include any suitable arrangement of gears engaged with each other.

As can be seen in FIG. 3A, in one embodiment, the adjustor gear train 44 preferably includes a worm 52 mounted on the adjustor cross-member 34, and a worm gear 54 mounted on the drive element, for meshable engagement with the worm 52. Preferably, the adjustor gear train 44 is self-locking. For example, the gear ratio of the adjustor gear train 44 may be between 10:1 and 20:1. Those skilled in the art would appreciate an advantage that is a consequence of the gear ratios, namely, once the adjustor cross-member 34 is rotated to move one of the lane guide elements 24 to a selected position thereof, the adjustor gear train 44 resists movement of the lane guide element 24 that is initiated by the containers 22 engaging the lane guide element 24, as the containers 22 are moved past the lane guide elements 24.

As noted above, for a container 22 having a width "W" thereof, there is an ideal or predetermined lane width 28. Those skilled in the art would be aware of how the "ideal" lane width is determined. Once the ideal or predetermined lane width 28 is determined, lane guide elements 24 preferably are moved transversely (i.e., relative to the predetermined direction of travel) to define the lanes 26 that have the lane widths 28 that are each the predetermined lane width 28.

However, because the lane widths are each the predetermined lane width 28, the containers 22 moving along the lanes tend to engage the lane guide elements 24 from time to time. The repeated engagements of the moving containers 22 with the lane guide elements 24 tend to push or urge the lane guide elements 24 apart. In order to resist the containers that are urging the lane guide elements apart, it is preferred that the lane guide elements 24 are held firmly in their respective selected positions (i.e., defining the predetermined lane width 28). Accordingly, it can be seen that it is important that the adjustor subassembly gear train 44 be self-locking, so that the engagement of the containers 22 by the containers 22 moving along the lanes 26 does not result in the lane guide elements 24 being pushed apart thereby.

Those skilled in the art would be aware of other techniques or devices that may be used in order to lock the lane guide elements 24 in respective positions to define the predetermined lane width 28 therebetween.

As can be seen, e.g., in FIGS. 1A and 1B, the lane guide element 24 preferably extends a predetermined length "L" between first and second ends 56, 58 thereof. It will be understood that the lane guide elements 24 that are included in the conveyor assembly 20 preferably are all the same length.

As will be described, it is preferred that the conveyor assembly 20 includes more than one lane guide element 24.

For convenience, the four lane guide elements illustrated in FIG. 1B are identified by reference characters 24A, 24B, 24C, and 24D respectively.

Figure 1D:
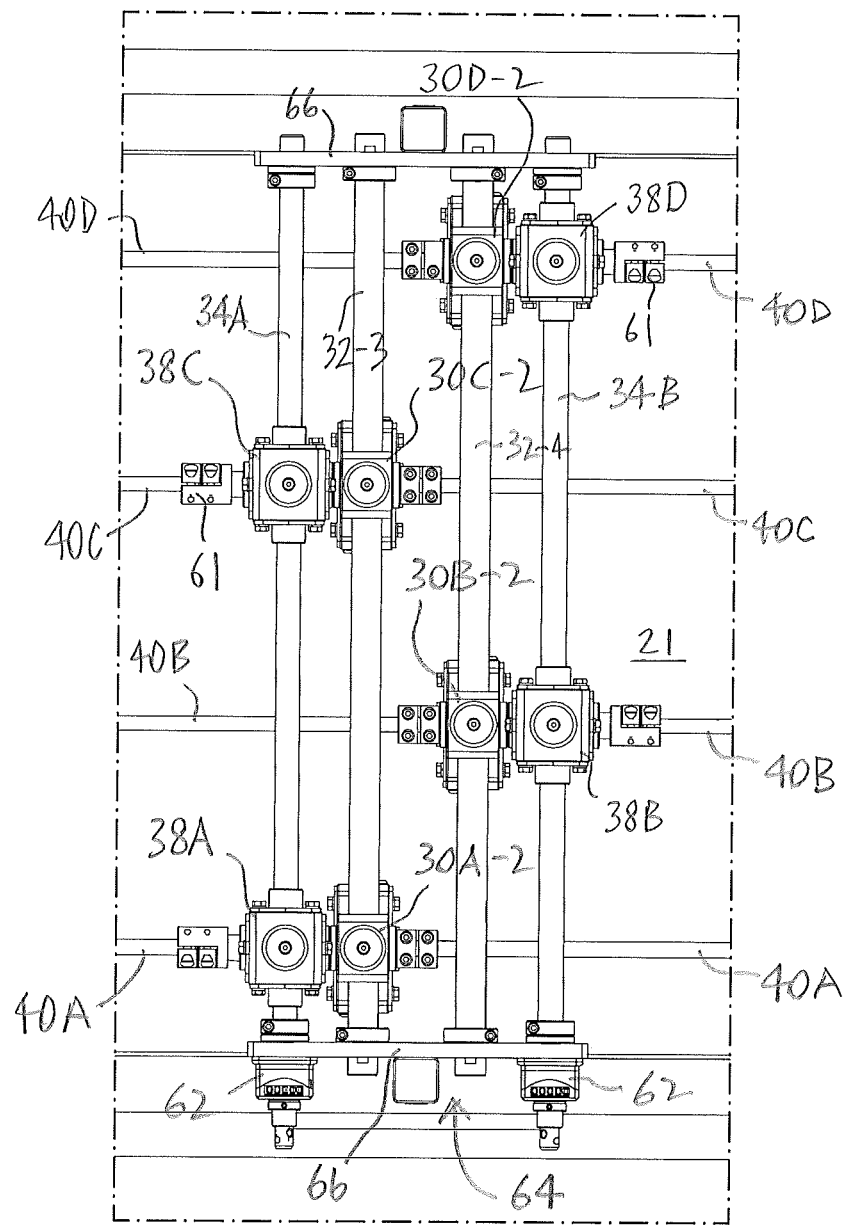
FIG. 1D is a portion of the conveyor assembly of FIG. 1B, drawn at a larger scale.

Preferably, the conveyor assembly 20 includes a number of point subassemblies 30 that are secured to the same lane guide element 24. As an example, in FIG. 1B, one of the lane guide elements is identified for convenience by reference character 24B, and the point subassemblies that are secured to the lane guide element 24B are identified for convenience by reference characters 30B-1, 30B-2, and 30B-3 respectively (FIGS. 1B, 1D). As can also be seen in FIGS. 1A and 1B, the conveyor assembly 20 preferably includes a number of point subassembly cross-members 32 on which the point subassemblies 30 that are connected to the lane guide element are respectively mounted. For example, as illustrated in FIGS. 1B and 1D, the point subassemblies 30B-1, 30B-2, and 30B-3 are mounted on point subassembly cross-members identified for convenience by reference characters 32-2, 32-4, and 32-6 respectively.

Each of the point subassembly cross-members 32 preferably is spaced apart from one or more point subassembly cross-members 32 of the point subassemblies that are adjacent thereto mounted thereon by a preselected distance "D" in the predetermined direction (FIG. 1B). It will be understood that the lane guide element 24 preferably is supported above the conveyor 21 along the predetermined length "L" thereof by the point subassemblies 30 that are secured to the lane guide element 24.

As noted above, it is preferred that the conveyor assembly 20 includes more than one of the lane guide elements 24. The more than one lane guide elements 24 define a number of lanes 26 therebetween respectively. The point subassemblies 30 that are secured to the respective lane guide elements 24 are arranged into respective lane guide element point groups 60. For example, the point subassemblies identified in FIG. 1B by reference characters 30B-1-30B-3, all of which are attached to the lane guide element 24B, are the lane guide element group identified in FIG. 1B by reference character 60B.

As can be seen, e.g., in FIGS. 1A, 1B, and 1D, it is also preferred that only a selected one of the lane guide adjustor subassemblies 38 is attached to any one group 60 of point subassemblies 30. For instance, as can be seen in FIG. 1B, the point subassemblies 30B-1-30B-3 are connected, via one or more drive elements 40, to the lane guide adjustor subassembly identified for convenience by reference character 38B in FIGS. 1B and 1D. The lane guide adjustor subassembly 38B is mounted on the adjustor cross-member identified in FIGS. 1D and 2E by reference character 34B for convenience.

It will be understood that the lane guide adjustor subassembly for a particular selected group 60 of the point subassemblies 30 may be connected with the point subassemblies of the group 60 via one or more drive elements 40. For instance, the drive element connecting with the point subassemblies of the group 60 may be a number of shorter pieces mechanically fastened together, or a single, long drive element.

For the purposes hereof, it is understood that a number of shorter pieces of the drive elements 40 are used to connect the lane guide adjustor subassembly 38 with the point subassemblies of the group 60. For example, referring to FIG. 2E, it will be understood that the drive element connecting the lane guide adjustor subassembly 38B and the point subassembly 30B-2 is relatively short.

In FIG. 1B, the drive element identified for convenience by reference character 40B connects the point subassemblies 30B-1 and 30B-2. As will be described, the drive element connecting the lane guide adjustor subassembly 38B and the point subassembly 30B-2 causes the point subassembly 30B-2 to move transversely, when the adjustor cross-member 34B is rotated about its axis. Because rotation of the adjustor cross-member 34B simultaneously causes rotation of the drive element 40B about its axis, such rotation of the adjustor cross-member 34B causes simultaneous transverse movement of the point subassembly 30B-1. Another part of the drive element, identified in FIG. 1B by reference character 40B' for convenience, operably connects the lane guide adjustor subassembly 38B with the point subassembly 30B-3. From the foregoing, it can be seen that the lane guide adjustor subassembly 38B is connected by the drive element(s), directly or indirectly, with the point subassemblies 30B-1-30B-3 of the group 60B, to cause transverse movement of the lane guide element 24B.

In one embodiment, the conveyor assembly 20 preferably includes a number of lane guide adjustor subassemblies 38 and a number of adjustor cross-members 34, and each of the lane guide adjustor subassemblies 38 preferably is mounted on a selected one of the adjustor cross-members 34 respectively. Preferably, the conveyor assembly 20 additionally includes a number of drive elements 40, each of the drive elements 40 being rotatable about the drive element axis 42 thereof (FIG. 3A). As can be seen in FIG. 1B, each of the lane guide adjustor subassemblies 38 preferably is connected with at least a selected one of the point subassemblies 30 in a selected one of the lane guide element groups 60. Rotation of the adjustor cross-member 34 on which the lane guide adjustor subassembly 38 is mounted that is connected with the at least one selected one of the point subassemblies causes corresponding transverse movement of the lane guide element 24 that is supported by the selected one of the lane guide element groups 60.

For example, in FIG. 1B, and as described above, it can be seen that the lane guide adjustor subassembly 38B is directly connected by drive elements with two point subassemblies, i.e., the point subassemblies 30B-2 and 30B-3. The point subassemblies 30B-1-30B-3 are connected with the lane guide element 24B. It will be understood that, in the same way, rotation of the adjustor cross-members on which the lane guide adjustor subassemblies 38A, 38C, and 38D are respectively mounted ultimately results in transverse movement of the lane guide elements 24A, 24C, and 24D.

In one embodiment, it is also preferred that the conveyor assembly 20 additionally includes one or more counter devices 62 connected with the adjustor cross-member 34, to count rotations of the adjustor cross-member 34 about the cross-member axis 36 thereof.

Those skilled in the art would appreciate that the adjustor cross-members 34 may each be rotated by any suitable means. For example, the rotation of the adjustor cross-member 34 may be effected by energizing an electric motor connected thereto, or manually, e.g., via a crank (not shown) attached to the adjustor cross-member.

As is known in the art, the counter devices 62 preferably are calibrated, so that a selected distance that the lane guide element 24 moves transversely in a selected transverse direction (i.e., as indicated by arrow "B" or by arrow "C" in FIG. 1B) is correlated to a certain number of rotations of the adjustor cross-member 34, in a selected rotation direction (i.e., clockwise, or counter-clockwise). Accordingly, it can be seen that if movement of a selected lane guide element 24 by a preselected distance and in the preselected transverse direction is required (i.e., to change the lane width to a new, predetermined lane width), the number of rotations of the adjustor cross-member needed for such movement is determinable, and the rotation direction is also determinable.

The counter device 62 permits an operator (not shown) to know when the adjustor cross-member 34 has been rotated the predetermined number of rotations, in the predetermined direction of rotation. Accordingly, the counter device 62 enables the operator to locate the relevant lane guide element 24, to precisely define the predetermined lane width. With the counter device 62, the operator may ensure that the adjustor cross-member is rotated by the predetermined number of rotations, in the predetermined rotation direction, to cause the lane guide element to be precisely positioned as required to define the predetermined lane width of the lane. Those skilled in the art would appreciate that the counter device 62 is particularly helpful where the adjustor cross-member 34 is manually rotated.

From the foregoing, it can be seen that rotation of a particular one of the adjustor cross-members 34 results in transverse movement of the point subassemblies of the group 60 to which the moved lane adjustor subassembly is connected, to move the lane guide element 24 to which that group 60 of point subassemblies is secured. The operator preferably uses the counter device 62 that is operably connected with the relevant adjustor cross-member 34 to rotate the adjustor cross-member by the predetermined number of rotations in the predetermined rotation direction, to cause the lane guide element 24 to be moved by the selected distance, in the selected transverse direction.

As shown in FIGS. 1A-1D, it is preferred that the conveyor assembly 20 includes more than one lane guide element 24, defining more than one lane 26. Those skilled in the art would appreciate that, as a practical matter, positioning the adjustor cross-members 34 proximal to each other is preferred when the adjustor cross-members 34 are manually rotated, because such positioning conveniently enables the operator to rotate the adjustor cross-members 34 as required. In addition, and as will be described, locating the adjustor cross-members proximal to each other, preferably in vertically-arranged pairs, locates them so that one of the pair may be utilized to provide support to the lane guide adjustor subassembly 38 that is mounted on the other adjustor cross-member.

As can be seen in FIGS. 1A and 1B, the point subassemblies 30 that support a particular lane guide element 24 preferably are positioned at locations that are spaced apart from each other, along the length "L" of the lane guide element 24. As will be described, in one embodiment, there are advantages to locating the point subassemblies secured to different lane guide elements at similar lengthwise locations relatively close to each other.

Those skilled in the art would also appreciate that the lane guide adjustor subassemblies (and the adjustor cross-members) and the point subassemblies (and the point subassembly cross-members) may be positioned relative to the lane guide elements in any suitable arrangement. The arrangement of the lane guide adjustor subassemblies are the point subassemblies as illustrated in the attached drawings is exemplary only.

For instance, the embodiment of the conveyor assembly 20 illustrated in FIGS. 1A-1D preferably includes a central unit 64. The central unit 64 preferably includes the lane guide adjustor subassemblies 38 and the adjustor cross-members 34 on which the lane guide adjustor subassemblies 38 are respectively mounted, and side plates 66 to which the adjustor cross-members 34 are mounted. As can be seen in FIGS. 1B and 1D, the central unit 64 preferably also includes certain of the point subassembly cross-members 32.

As will also be described, the conveyor assembly 20 preferably also includes first and second end units 68, 70, in which the other point subassembly cross-members 32 are located (FIGS. 1A, 1B, and 4A-4E). The first and second end units 68, 70 are spaced apart from the central unit 64, so that the point subassemblies located in the first and second end units 68, 70 and also in the central unit 64 support the respective lane guide elements 24 to which they are secured at approximately equal distances apart from each other along the length of each lane guide element respectively.

Preferably, the central unit 64 is supported by one or more posts 72 that are secured to a stationary base 74 in any suitable manner. Similarly, the first and second end units 68, 70 preferably are supported by posts 76 secured to the base 74 in any suitable manner (FIG. 1A).

As can be seen in FIGS. 1B, 1D, 2A, and 2C-2H, in one embodiment, pairs of the adjustor cross-members 34 preferably are positioned so that one of the adjustor cross-members is vertically aligned with the other. For example, the adjustor cross-member 34A is positioned above the adjustor cross-member 34C. When the central unit 64 is secured in position above the conveyor 21, the adjustor cross-members 34A, 34C are vertically aligned (FIG. 2A).

It will be understood that the lane guide adjustor subassembly 38A is mounted on the adjustor cross-member 34A, and the adjustor cross-member 34C is only journalled in a lower part 80 of the housing 39 of the lane guide adjustor subassembly 38A (FIG. 2A). Similarly, the lane guide adjustor subassembly 38C is mounted on the adjustor cross-member 34C, and the adjustor cross-member 34A is journalled in an upper part 82 of the housing 39 of the lane guide adjustor subassembly 38C (FIG. 2A).

It will be understood that the housings 39 of the lane guide adjustor subassemblies 38A, 38C are omitted from FIGS. 2C and 2D for clarity of illustration.

As can be seen in FIGS. 2B-2F and 3A, the worm 52 that is included in the adjustor gear train 44 of the lane guide adjustor subassembly 38A is mounted on the adjustor cross-member 34A. Such worm 52 is meshably engaged with the worm gear 54 that is mounted on the drive element 40A. Bushings 84 that are mounted on the adjustor cross-member 34A proximal to the worm 52, to facilitate rotation of the adjustor cross-member 34A relative to the housing 39 of the lane guide adjustor subassembly 38A, can be seen in FIGS. 2C and 2D.

As can also be seen in FIGS. 2C, 2D, 2F, 2G, and 2H, the adjustor gear train 44 of the lane guide adjustor subassembly 38C includes the worm 52 that is mounted on the cross-member 34C. Such worm 52 is meshably engaged with the worm gear 54 that is mounted on the drive element 40C.

Bushings 86 mounted on the cross-member 34C to facilitate rotation of the cross-member 34C relative to the housing 39 of the lane guide adjustor subassembly 38A can also be seen in FIGS. 2C and 2D. Also, the bushings 84 that are mounted on the cross-member 34C (to facilitate rotation of the adjustor cross-member 34C relative to the housing 39 of the lane guide adjustor subassembly 38C) and the bushings 86 that are mounted on the cross-member 34A (to facilitate rotation of the adjustor cross-member 34A relative to the housing 39 of the lane guide adjustor subassembly 38C) can be seen in FIGS. 2C and 2D.

In FIGS. 2C, 2E, and 2F, it can be seen that the lane guide adjustor subassemblies 38B, 38D are similarly mounted on the cross-members 34B, 34D respectively. It will be understood that the adjustor gear train 44 thereof (not shown) of the lane guide adjustor subassembly 38B includes the worm 52 (not shown) on the adjustor cross-member 34B, and the worm 52 thereof is meshably engaged with the worm gear 54 (not shown) mounted on the drive element 40B (FIG. 1D). In the same way, the lane guide adjustor subassembly 38D includes the adjustor gear train 44 thereof (not shown) the worm 52 thereof (not shown) that is mounted on the adjustor cross-member 34D, and the worm 52 thereof is meshably engaged with the worm gear 54 (not shown) that is mounted on the drive element 40D (FIG. 1D).

Accordingly, the adjustor cross-member 34B is journalled in the upper part 82 of the housing 39 of the lane guide adjustor subassembly 38D (FIG. 2C). The adjustor cross-member 34D is journalled in the lower part 80 of the housing 39 of the lane guide adjustor subassembly 34B (FIG. 2F).

From the foregoing, it can be seen that movement of the lane guide elements 24A-24D is initiated, and effected, by rotation of the adjustor cross-members 34A-34D respectively. It will be understood that this arrangement of the pairs of adjustor cross-members (i.e., 34A and 34C, and 34B and 34D, respectively), in which one of the adjustor cross-members is journalled in the housing of a transversely adjacent lane guide adjustor subassembly, has the benefit of stabilizing or supporting the adjacent lane guide adjustor subassembly.

For instance, those skilled in the art would appreciate that rotation of the adjustor cross-member 34A about the axis 36 would, in the absence of the adjustor cross-member 34C located in the lower part 82 of the housing 39 of the lane guide adjustor subassembly 38A, tend to cause the housing 39 to rotate in the same direction about the axis 36. However, because the adjustor cross-member 34C passes through the lower part 82 of the housing 39 and is parallel to the adjustor cross-member 34A, this tendency is primarily resisted by the adjustor cross-member 34C, and the components of the adjustor gear train 44 are generally only minimally subjected to torque in the direction of rotation of the adjustor cross-member 34A.

It will be understood that, in the same way, the other lane guide adjustor subassemblies 38B, 38C, and 38D are supported by the adjustor cross-members that are only journalled in the respective housings 39 thereof. For example, the adjustor cross-member 34A is journalled in the upper part 82 of the housing 39 of the lane guide adjustor subassembly 38C. In the absence of this, rotation of the adjustor cross-member 34C about its axis would tend to cause the housing 39 to rotate in the same direction. The adjustor cross-member 34A passes through the upper part 82 of the housing 39 and is parallel to the adjustor cross-member 34C, so the adjustor cross-member 34A resists such tendency.

As can be seen in FIG. 2A, the central unit 64 preferably includes point subassemblies 30 for each of the lane guide elements 24A-24D. The point subassemblies that are included in the central unit 64 are identified in FIGS. 1D, 2E, and 2F for convenience by reference characters 30A-2, 30B-2, 30C-2, and 30D-2.

The point subassemblies 30A-2, 30B-2, 30C-2, and 30D-2 are mounted on the point subassembly cross-members of the central unit 64, which are identified for convenience in FIGS. 1D and 2E by reference characters 32-3 and 32-4. Specifically, the point subassemblies 30A-2 and 30C-2 are mounted on the point subassembly cross-member identified by reference character 32-3, and the point subassemblies 30B-2 and 30D-2 are mounted on the point subassembly cross-member identified by reference characters 32-4 (FIGS. 2E, 2F).

As described above, the point subassembly 30 is caused to move transversely (i.e., along the point subassembly cross-member 32 on which it is mounted) by rotation of the drive element 40 connected with the point subassembly 30, which causes the pinion gear 50 of the drive element 40 to meshably engage the rack element 46 on the point subassembly cross-member 32.

As can be seen in FIG. 2F, the rack element 46 for both of the point subassemblies 30A-2 and 30C-2 is included in the point subassembly cross-member 32-3. Similarly, the rack element 46 for both of the point subassemblies 30B-2 and 30D-2 is included in the point subassembly cross-member 32-4.

Figure 2G:
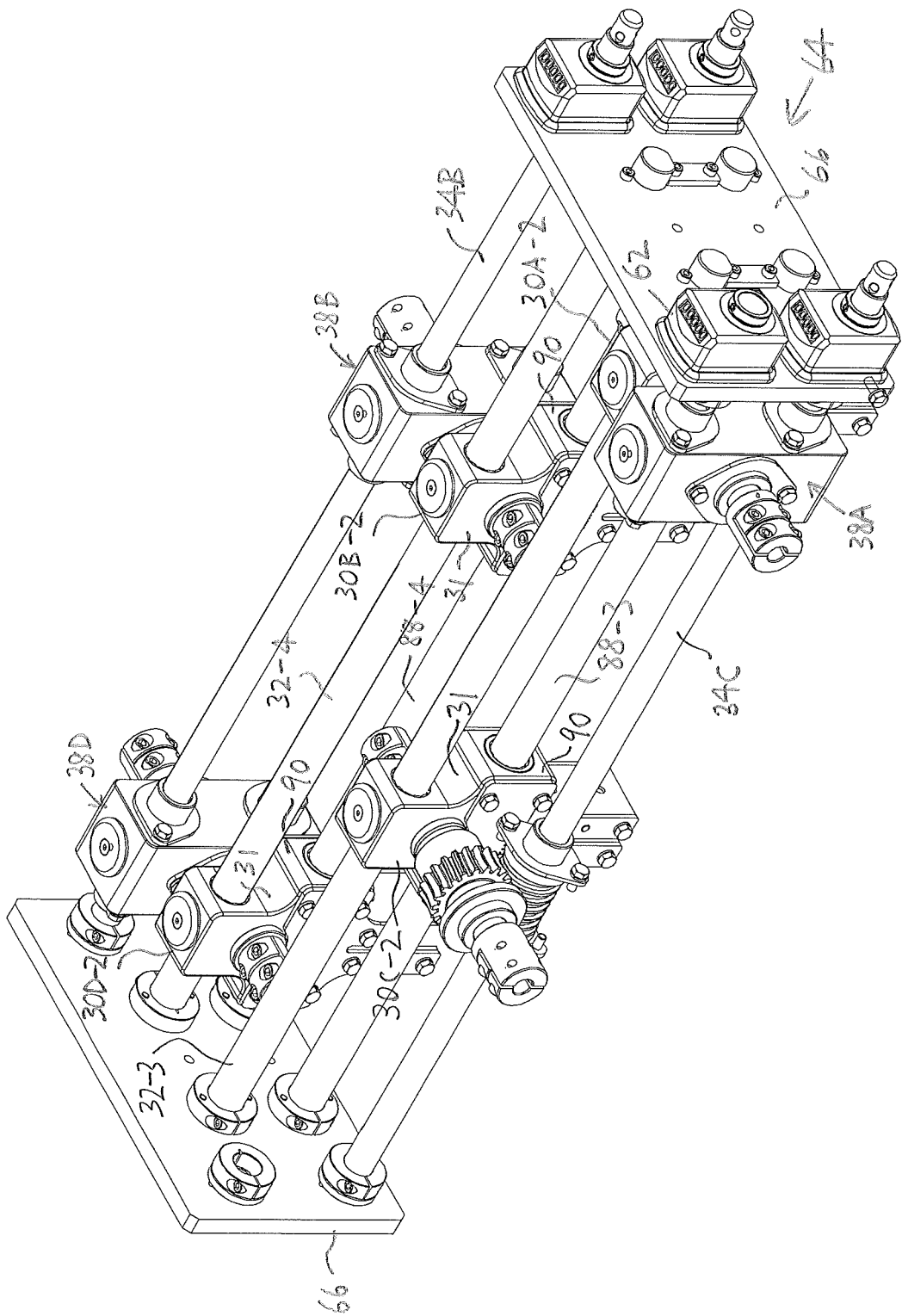
FIG. 2G is another isometric view of the central unit of FIG. 2A with an adjustor cross-member and certain other elements omitted, drawn at a smaller scale.
Figure 2H:
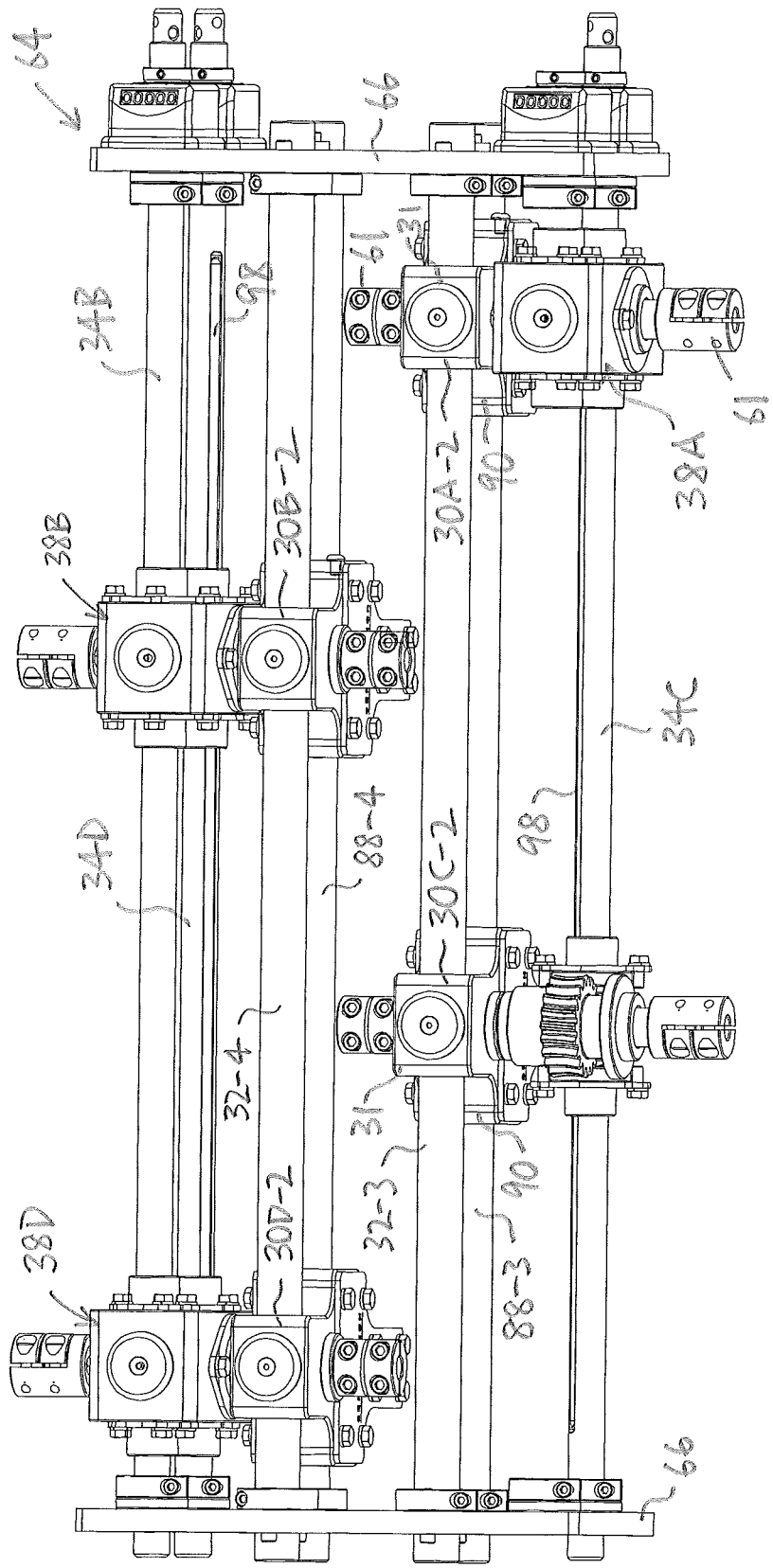
FIG. 2H is another isometric view of the central unit of FIG. 2G.

In one embodiment, the central unit 64 preferably also includes stabilizing cross-members 88 (FIGS. 2A, 2F, 2G). For convenience, the stabilizing cross-members illustrated in FIGS. 2F-2H are identified by reference characters 88-3 and 88-4. It will be understood that certain elements are omitted from FIGS. 2F-2H for clarity of illustration.

As can be seen in FIGS. 2F and 2G, the stabilizing cross-members 88 preferably are journalled in a lower part 90 of the body 31 of the point subassembly 30. For example, the stabilizing cross-member 88-3 is journalled in the bodies 31 of the point subassemblies 30A-2 and 30C-2. Similarly, the stabilizing cross-member 88-4 is journalled in the lower parts 90 of the bodies 31 of the point subassemblies 30B-2 and 30D-2.

As described above, the point subassemblies are moved transversely, when actuated by rotation of the appropriate adjustor cross-member. The transverse movement is linear, i.e., the point subassembly moves along the point subassembly cross-member on which it is mounted. The stabilizing cross-members 88 facilitate such linear movement by the point subassemblies to which the stabilizing cross-members are connected.

As noted above, the conveyor assembly 20 preferably includes the first and second end units 68, 70, in which additional point subassemblies are located. In one embodiment, the first and second end units 68, 70 preferably are substantially the same, positioned at opposite ends of the lane guide elements 24.

The second end unit 70 is shown in FIGS. 4A-4D. It will be understood that certain elements are omitted from FIGS. 4A-4D for clarity of illustration. The first end unit 68 is illustrated in FIG. 4E.

In FIG. 1B, for clarity of illustration, the point subassemblies connected with the lane guide elements 24A-24D respectively are identified as follows: lane guide element 24A, 30A-1 to 30A-3; lane guide element 24B, 30B-1 to 30B-3; lane guide element 24C, 30C-1 to 30C-3; and lane guide element 24D, 30D-1 to 30D-3.

Figure 4A:
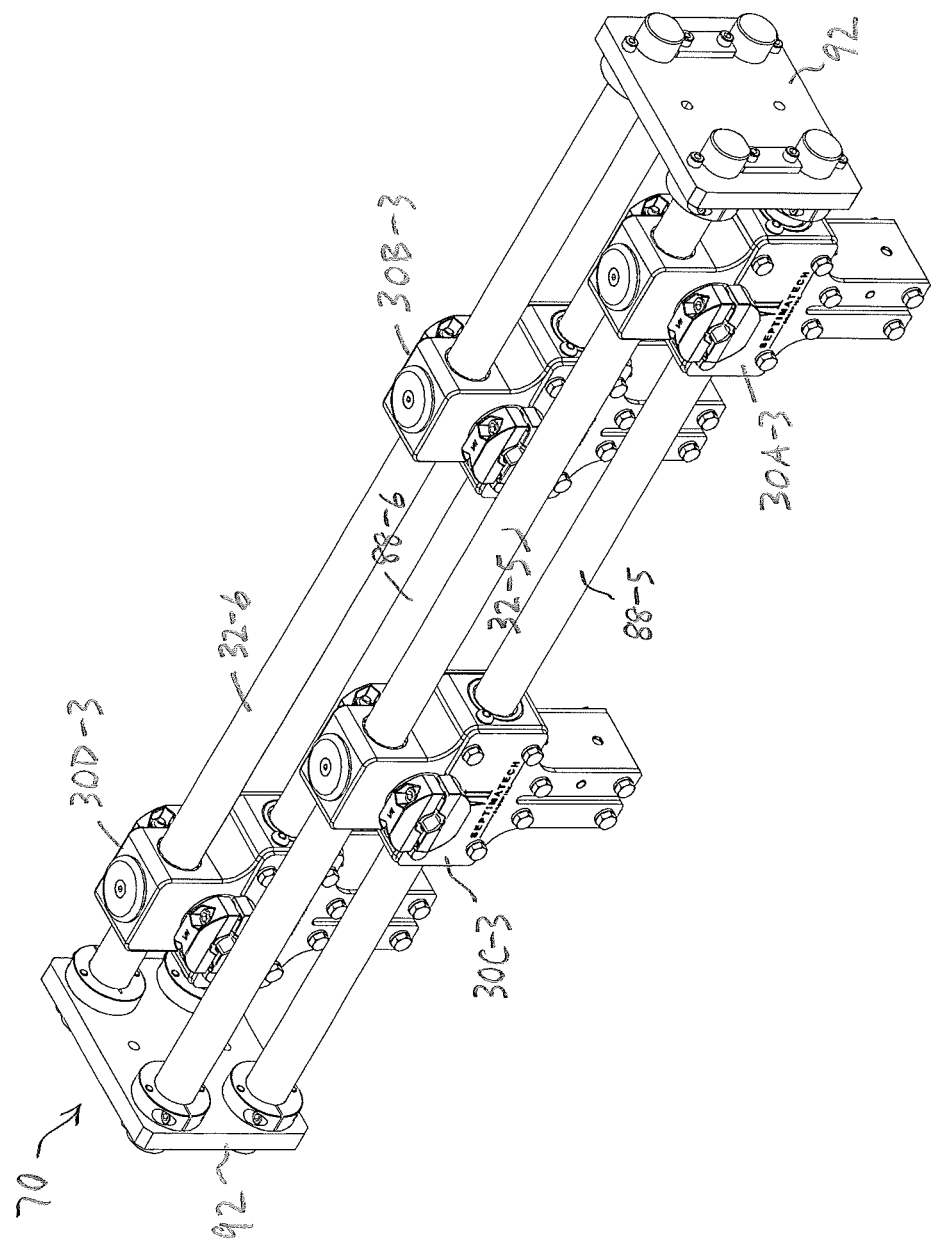
FIG. 4A is an isometric view of the second end unit of the conveyor assembly of FIGS. 1A-1C, drawn at a smaller scale.
Figure 4B:
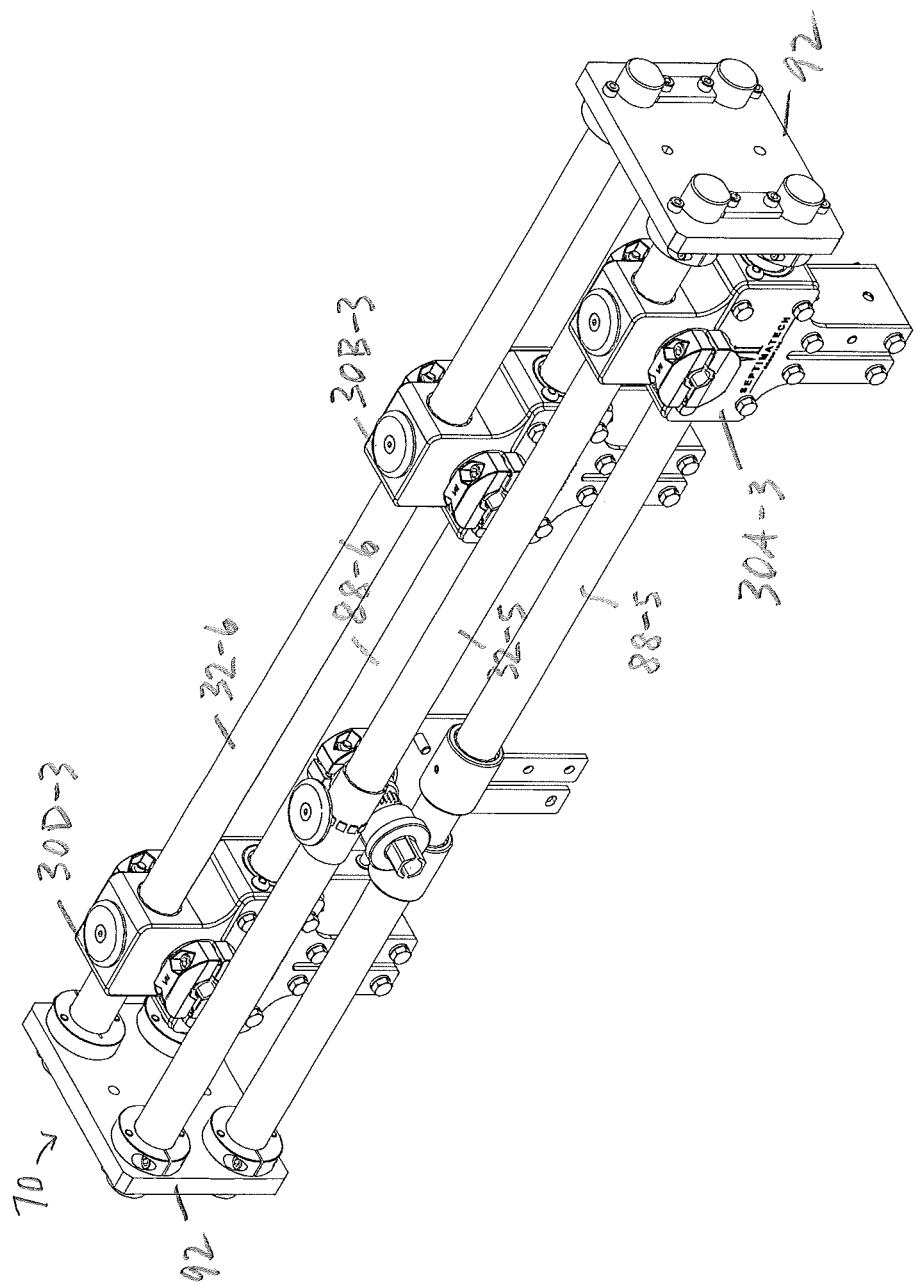
FIG. 4B is an isometric view of the second end unit of FIG. 4A from which certain elements are omitted.
Figure 4C:
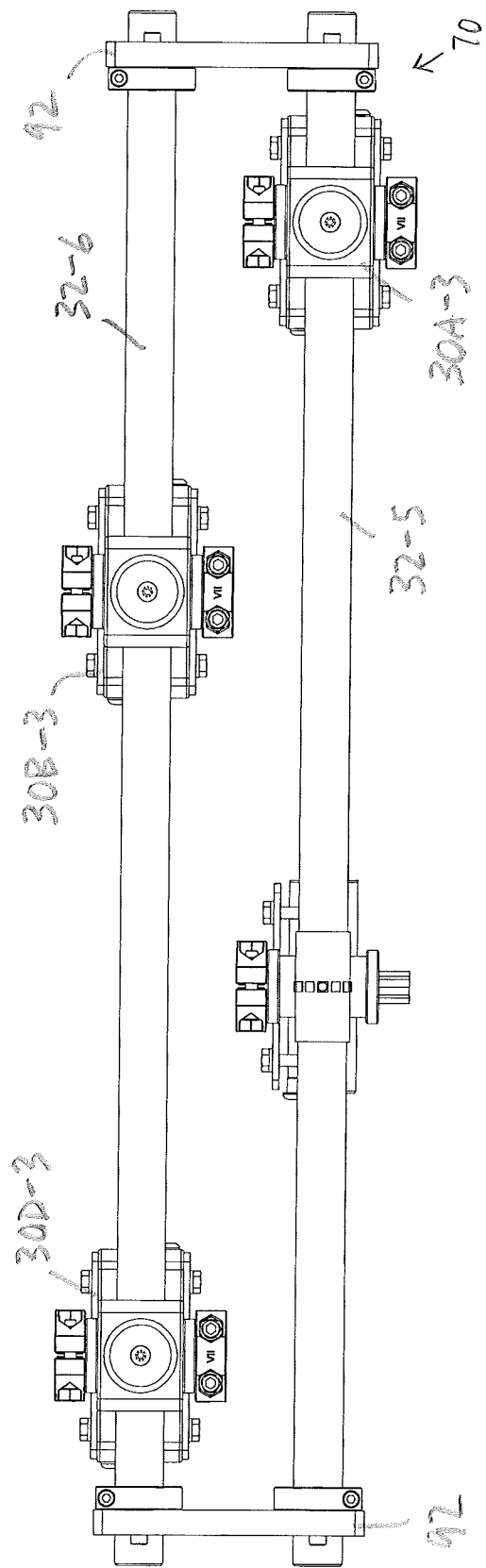
FIG. 4C is a top view of the second end unit of FIG. 4B.
Figure 4D:
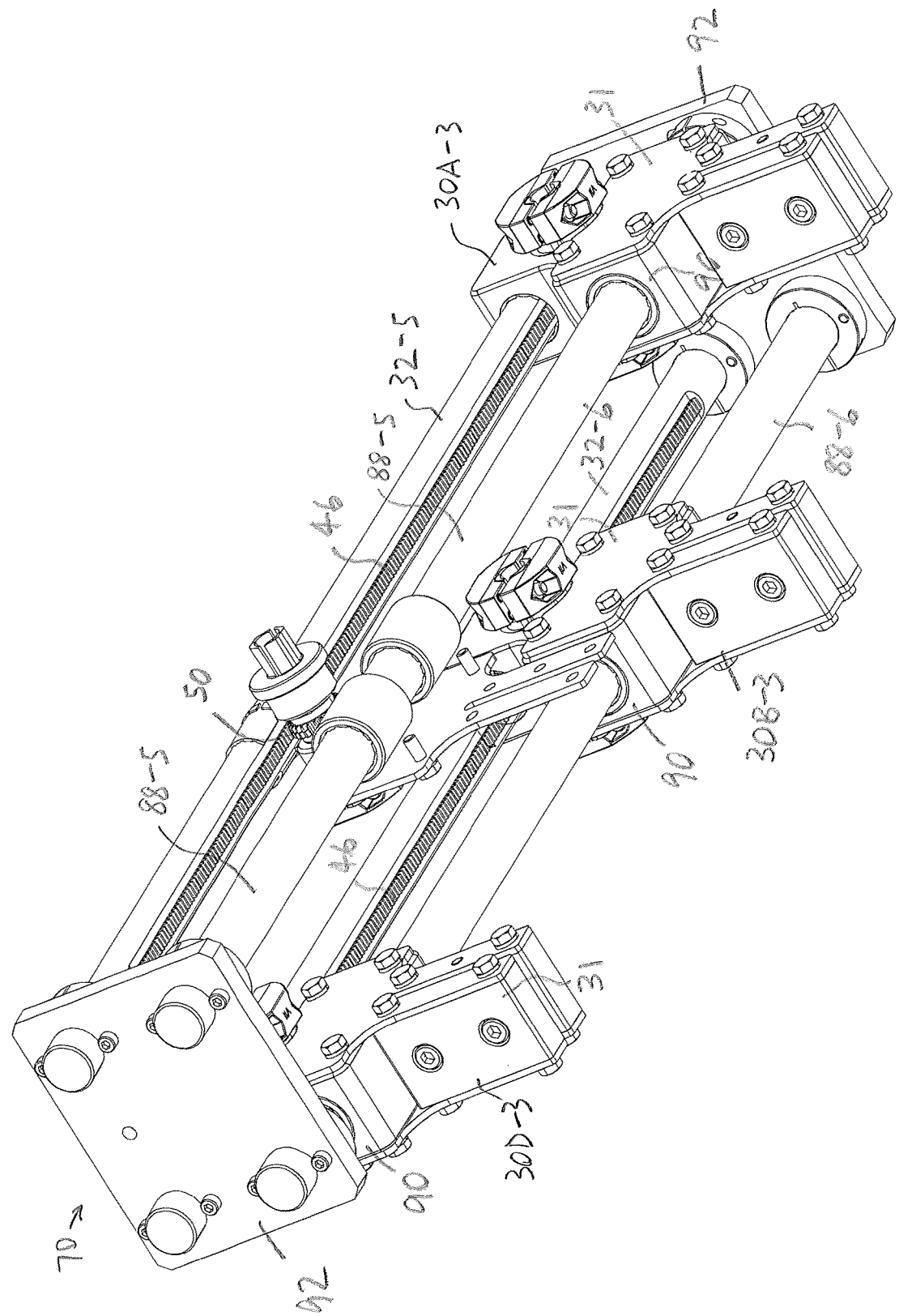
FIG. 4D is another isometric view of the second end unit of FIG. 4B, drawn at a larger scale.
Figure 4E:
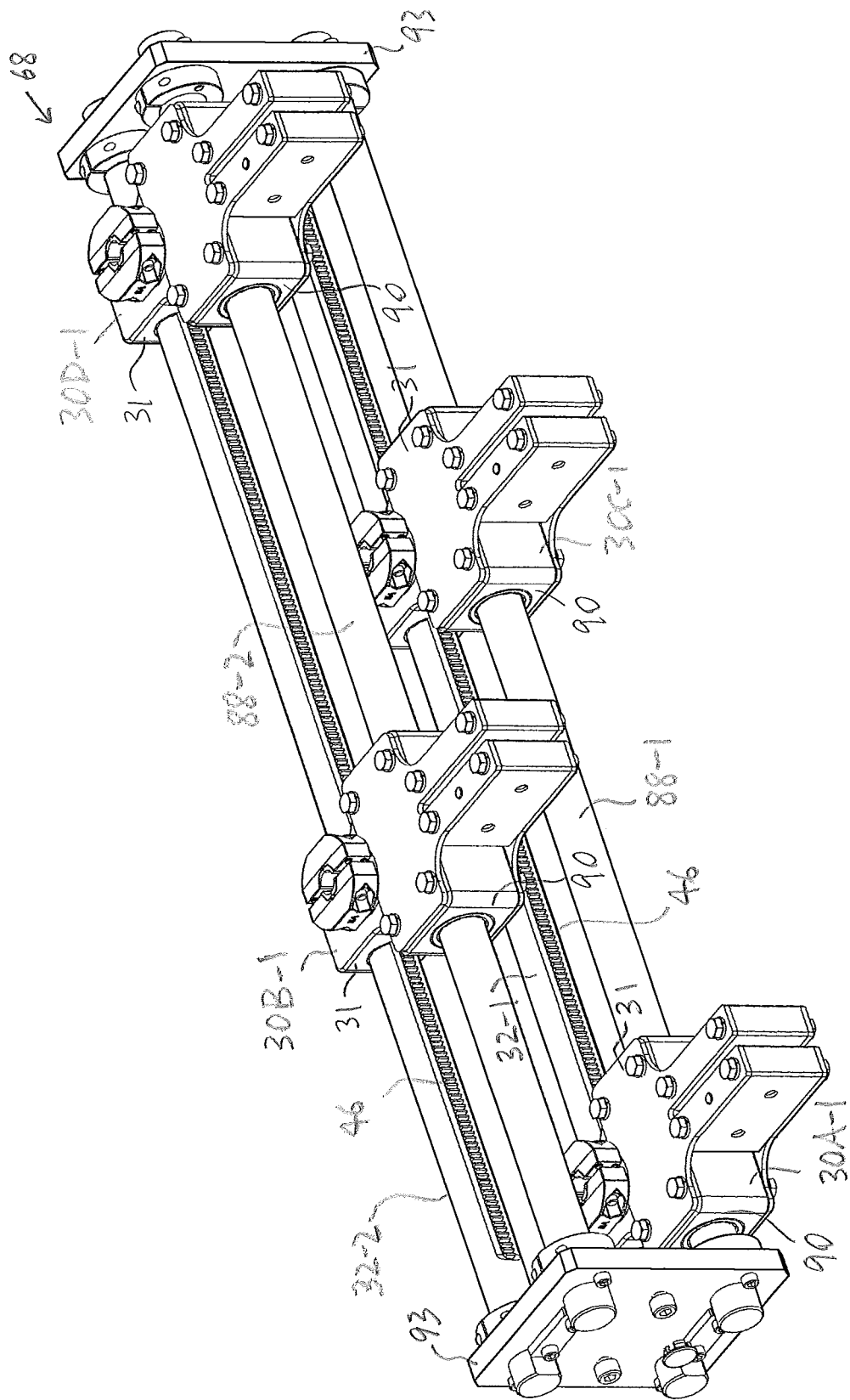
FIG. 4E is an isometric view of the first end unit of the conveyor assembly of FIGS. 1A-1C, drawn at a smaller scale.

In FIGS. 4A-4D, the point subassemblies 30A-3, 30B-3, 30C-3, and 30D-3, in the second end unit 70, are illustrated. The point subassemblies 30A-3 and 30C-3 are mounted on the point subassembly cross-member 32-5, as can be seen in FIG. 4D. The point subassemblies 30B-3, 30D-3 are mounted on the point subassembly cross-member 32-6 (FIG. 4D). Most of the housing 31 of the point subassembly 30C-3 is omitted from FIGS. 4B-4D for clarity of illustration. It will be understood that all the point subassemblies are structured the same. The point subassembly 30A-3 is operably connected with the lane guide adjustor subassembly 38A by the drive element 40A, via the point subassembly 30A-2. That is, it will be understood that the drive element 40A that includes the pinion gear 50 meshably engaged with the rack element 46 of the point subassembly cross-member 32-5 rotates in unison with, and substantially simultaneously with, all other parts of the drive element 40A. Accordingly, upon rotation of the adjustor cross-member 34A about its axis, all of the point subassemblies of the group (i.e., the point subassemblies 30A-1, 30A-2, and 30A-3) are moved transversely by the same distance, in the same direction, and substantially simultaneously.

It will be understood that this is also the case for all of the other three groups of point subassemblies (i.e., point subassemblies 30B-1-30B-3; point subassemblies 30C-1-30C-3; and point subassemblies 30D-1-30D-3), upon initiation of movement by rotation of the respective adjustor cross-members (i.e., adjustor cross-members 34B, 34C, and 34D, respectively).

Preferably, the second end unit 70 includes plates 92 to which the point subassembly cross-members 32-5, 32-6 are secured. As shown in FIG. 1A, the plates 92 are secured to posts 78 that support the second end unit 70.

As can be seen in FIG. 4D, the second end unit 70 preferably also includes stabilizing cross-members, identified for clarity of illustration by reference characters 88-5 and 88-6. The stabilizing cross-members 88-5, 88-6 are secured to the plates 92.

As described above, the stabilizing cross-members are journalled in the respective bodies of the point subassemblies, to resist the transversely direction engagements of the containers that urge the lane guide elements apart as the containers are moved by the conveyor 21.

As can be seen in FIG. 4E, the first end unit 68 includes the point subassembly cross-members 32-1, 32-2, with the point subassemblies 30A-1, 30C-1 mounted on the point subassembly cross-member 32-1, and the point subassemblies 30B-1, 30D-1 mounted on the point subassembly cross-member 32-2. The first end unit 68 preferably also includes stabilizing cross-members 88-1, 88-2. The stabilizing cross-member 88-1 is journalled in the bodies of the point subassemblies 30A-1, 30C-1, and the stabilizing cross-member 88-2 is journalled in the bodies of the point subassemblies 30B-1, 30D-1. It will be understood that the stabilizing cross-members 88-1, 88-2 have the same stabilizing effect in the point subassemblies of the first end unit 68 as in the central unit 64 and in the second end unit 70.

Preferably, the first end unit 68 includes plates 93 to which the point subassembly cross-members 32-1, 32-2 are secured. The stabilizing cross-members 88-1, 88-2 are also secured to the plates 93. The plates 93 preferably are secured to posts 76 that support the first end unit 68.

Figure 3F:
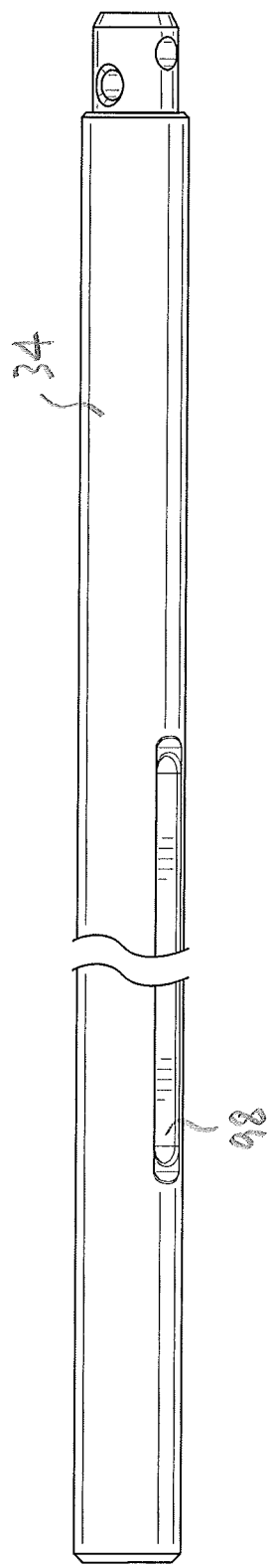
FIG. 3F is a side view of the adjustor cross-member, drawn at a larger scale.
Figure 3G:
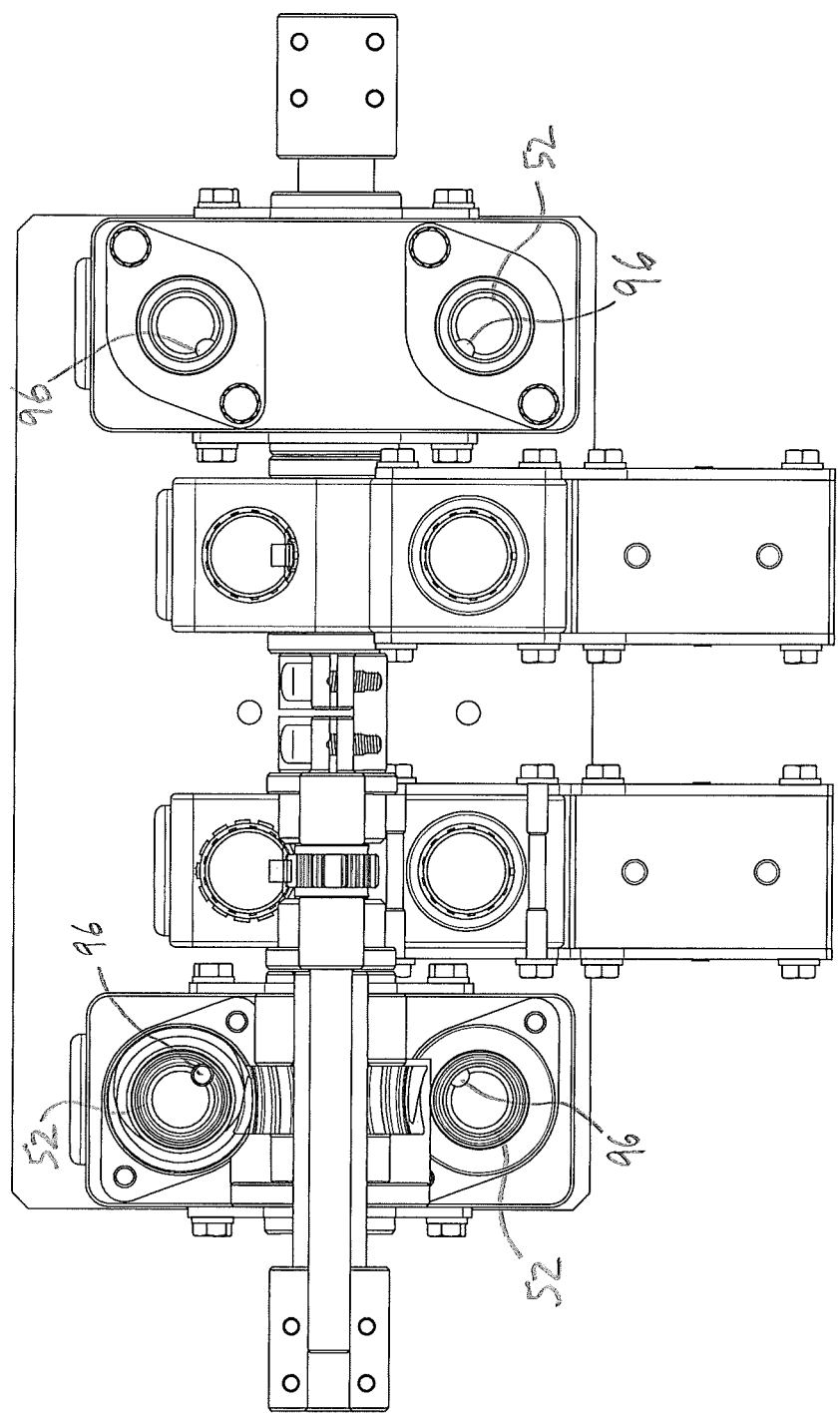
FIG. 3G is a cross-section of the central unit, drawn at a smaller scale.

In order to permit corresponding transverse movement of the lane guide adjustor assembly, the worm 52 preferably includes an internal slot 94 in which one or more key elements 96 may be positioned (FIG. 3G). As can be seen in FIGS. 3F and 3G, in one embodiment, the key elements 96 that are in the internal slot 94 preferably are receivable in a keyway slot 98 in the adjustor cross-member 34. The key elements 96 may be any suitable elements. For instance, in one embodiment, the key elements 96 may be a number of ball bearings, to facilitate transverse movement of the worm 52 along the adjustor cross-member 34 while the adjustor cross-member 34 rotates about the axis 36 thereof.

As can be seen in FIG. 1D, arrangement of the point subassemblies 30 and the lane guide adjustor subassemblies 38 in the central unit 64, i.e., on cross-members that are offset from each other, permits the lane guide elements 24 to be adjusted, if necessary, to positions in which the lane guide elements 24 are relatively close to each other. Those skilled in the art would appreciate that this may be necessary where the predetermined lane width is relatively narrow. The housings 31 preferably are formed with recesses 99 to accommodate the drive elements 40 of neighboring lane guide element groups, when the lane guide elements are positioned relatively small distances apart from each other (FIG. 2D).

The offset arrangements of the point subassemblies in the first and second end units 68, 70 also permit the lane guide elements 24 to be adjusted, if necessary, to positions in which the lane guide elements 24 are relatively close to each other (e.g., where the predetermined lane width is relatively narrow). The housing 31 of the point subassemblies in the first and second end units also include recesses 99 to accommodate the drive elements of neighboring lane guide element groups.

From the foregoing, it can be seen that the conveyor assembly 20 preferably includes a lane adjustment system 23 (FIG. 1B) installed on the conveyor 21. The lane adjustment system 23 preferably includes the point subassembly cross-members 32, the point subassemblies 30, the lane guide elements 24, the drive elements 40, the adjustor cross-members 34, and the lane guide adjustor subassemblies 38.

Those skilled in the art would appreciate that the conveyor assembly 20 as illustrated is exemplary, and more or fewer groups of point subassemblies may be included in the conveyor assembly 20 as required.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A conveyor assembly having a conveyor for moving containers in a preselected direction, the conveyor assembly comprising:

at least one lane guide element, for at least partially defining at least one lane along which the containers are movable by the conveyor, said at least one lane having a lane width that is transverse to the preselected direction;

at least one point subassembly, connected with said at least one lane guide element;

at least one point subassembly cross-member on which said at least one point subassembly is mounted;

at least one adjustor cross-member positioned transverse to the preselected direction and rotatable about an adjustor cross-member axis thereof;

at least one lane guide adjustor subassembly mounted on said at least one adjustor cross-member;

at least one drive element connecting said at least one lane guide adjustor subassembly and said at least one point subassembly, said at least one drive element being rotatable about a drive element axis thereof and partially located inside a body of said at least one point subassembly that is secured to said at least one lane guide element;

said at least one lane guide adjustor subassembly comprising an adjustor gear train configured to translate rotation of said at least one adjustor cross-member about the cross-member axis into rotation of said at least one drive element about the drive element axis;

said at least one point subassembly being movable on said at least one point subassembly cross-member transversely relative to the preselected direction, for moving said at least one lane guide element to a predetermined position therefor to adjust the lane width of said at least one lane, in response to rotation of said at least one drive element about the drive element axis;

the adjustor gear train comprising:
a worm mounted on said at least one adjustor cross-member;
a worm gear mounted on said at least one drive element, for meshable engagement with the worm; and
the adjustor gear train having a gear ratio such that the adjustor gear train is self-locking, to maintain said at least one lane guide element in the predetermined position therefor.

2. A conveyor assembly according to claim 1 in which said at least one point subassembly is movable on said at least one point subassembly cross-member orthogonally relative to the preselected direction.

3. A conveyor assembly according to claim 1 in which:
said at least one point subassembly cross-member comprises a rack element; and
said at least one drive element comprises at least one drive element body and at least one pinion gear mounted on said at least one drive element body, said at least one pinion gear being adapted for meshable engagement with said at least one rack element, wherein rotation of said at least one drive element body about the drive element axis causes corresponding rotation of said at least one pinion gear about the drive element axis, to move the body of said at least one point subassembly along said at least one point subassembly cross-member, for corresponding transverse movement of said at least one lane guide element to adjust the lane width of said at least one lane.

4. A conveyor assembly according to claim 1 in which:
said at least one lane guide element extends a predetermined length between first and second ends thereof;
said at least one point subassembly comprises a plurality of point subassemblies secured to said at least one lane guide element at locations spaced apart from each other along said at least one lane guide element;
said at least one point subassembly cross-member comprises a plurality of point subassembly cross-members on which the point subassemblies that are connected to said at least one lane guide element are respectively mounted, each said point subassembly cross-member being spaced apart from one or more point subassembly cross-members of the point subassemblies adjacent thereto mounted thereon by at least one preselected distance in the predetermined direction; and
said at least one lane guide element is supported above the conveyor along the predetermined length thereof by the point subassemblies connected thereto.

5. A conveyor assembly according to claim 4 in which:
said at least one lane guide element comprises a plurality of lane guide elements, the lane guide elements defining a plurality of lanes therebetween respectively;
said at least one lane guide element comprising a plurality of lane guide elements; and
the respective lane guide elements being connected with the point subassemblies, the point subassemblies connected with each respective said lane guide element comprising respective lane guide element groups.

6. A conveyor assembly according to claim 5 in which:
said at least one lane guide adjustor subassembly comprises a plurality of lane guide adjustor subassemblies, and said at least one adjustor cross-member comprises a plurality of adjustor cross-members;

each said lane guide adjustor subassembly being mounted on a selected one of the adjustor cross-members respectively;
said at least one drive element comprises a plurality of drive elements, each said drive element being rotatable about the drive element axis thereof; and
each said lane guide adjustor subassembly being connected with at least a selected one of the point subassemblies in a selected one of the lane guide element groups, wherein rotation of the adjustor cross-member on which said lane guide adjustor subassembly that is connected with the at least one selected one of point subassemblies is mounted causes corresponding transverse movement of the lane guide element that is supported by the selected one of the lane guide element groups.

7. A conveyor assembly according to claim 1 additionally comprising at least one counter device connected with said at least one adjustor cross-member and located proximal to an end of said at least one adjustor cross-member, to count rotations of said at least one adjustor cross-member about the cross-member axis thereof.

8. A conveyor assembly according to claim 7 in which said at least one counter device is calibrated such that a preselected distance moved transversely by said at least one lane guide element is correlated to a preselected number of rotations of said at least one adjustor cross-member in a preselected rotation direction.

9. A conveyor assembly according to claim 8 in which rotation of said at least one adjustor cross-member is initiated at an end of said at least one adjustor cross-member proximal to said at least one counter device therefor.

10. A method of adjusting a lane width of at least one lane at least partially defined by at least one lane guide element, said at least one lane being sized to guide a container moved by a conveyor in a preselected direction along said at least one lane, the method comprising:
(a) providing at least one point subassembly, connected with said at least one lane guide element;
(b) providing at least one point subassembly cross-member located transverse to the preselected direction, on which said at least one point subassembly is mounted;
(c) providing at least one adjustor cross-member positioned transverse to the preselected direction and rotatable about a cross-member axis thereof;
(d) providing at least one lane guide adjustor subassembly mounted on said at least one adjustor cross-member;
(e) providing at least one drive element connecting said at least one lane guide adjustor subassembly and said at least one point subassembly, said at least one drive element being rotatable about a drive element axis thereof;
(f) rotating said at least one adjustor cross-member about the cross-member axis;
(g) with an adjustor gear train in said at least one lane guide adjustor subassembly, translating the rotation of said at least one adjustor cross-member to rotation of said at least one drive element about the drive element axis thereof, the adjustor gear train comprising:
a worm mounted on said at least one adjustor cross-member; and
a worm gear mounted on said at least one drive element, for meshable engagement with the worm, the adjustor gear train having a gear ratio such that the adjustor gear train is self-locking, to maintain said at least one lane guide element in a predetermined position; and (h) with the rotation of said at least one drive element about the drive element axis thereof, causing said at least one point subassembly to move along the point subassembly cross-member on which said at least one point subassembly is mounted, to move said at least one lane guide element to the predetermined position, to adjust the lane width of said at least one lane.

11. A lane adjustment system for guiding containers moved by at least one conveyor in a preselected direction in a plurality of lanes, each said lane having a lane width that is transverse relative to the preselected direction, the lane adjustment system comprising:
a plurality of lane guide elements, to at least partially define the respective lanes, each said lane guide element having a predetermined length;
a plurality of point subassembly cross-members positioned at least partially transverse relative to the preselected direction and spaced apart from each other in the preselected direction along said at least one conveyor;
a plurality of point subassemblies connected to the lane guide elements for locating the lane guide elements in predetermined positions relative to the conveyor, the point subassemblies connected with the lane guide elements respectively comprising lane guide element groups for the lane guide elements respectively, each said point subassembly being mounted respectively on a selected one of the point subassembly cross members;
a plurality of drive elements, each said drive element being rotatable about a drive element axis thereof respectively, and each said drive element being operatively connected with a selected one of the lane guide element groups, for causing movement of the lane guide element to which the point subassemblies in the selected one of the lane guide element groups are connected;
a plurality of adjustor cross-members, each said adjustor cross-member being rotatable about a cross-member axis thereof respectively, said at least one adjustor cross-member being located transverse relative to the preselected direction;
a plurality of lane guide adjustor subassemblies, each said lane guide adjustor subassembly being mounted on a selected one of said adjustor cross-members respectively, each said lane guide adjustor assembly being operatively connected with the point subassemblies of a selected one of the lane guide element groups by said drive element operatively connected with the selected one of the lane guide element groups;
each said lane guide adjustor subassembly comprising an adjustor gear train configured to translate rotation of the adjustor cross-member on which each said lane guide adjustor subassembly is respectively mounted to corresponding rotation of the drive element to which each said lane guide adjustor subassembly is operatively connected respectively;
each said point subassembly cross-member comprising a rack element;
each said drive element comprising at least one drive element body, and a plurality of pinion gears mounted on said at least one drive element body, for meshable engagement of each of the pinion gears with selected ones of the respective rack elements on the point subassembly cross-members, wherein rotation of a selected one of the adjustor cross-members causes transverse movement of a selected one of the lane guide elements that is connected with the selected one of the lane guide element groups via the adjustor gear train of a selected one of the lane guide adjustor subassemblies mounted on the selected one of the adjustor cross-members, to move the selected one of the lane guide elements to a predetermined position relative to the conveyor; and
each said adjustor gear train comprising a worm mounted on each said adjustor cross-member respectively, and a worm gear mounted on each said drive element respectively for meshable engagement with the worm, such that each said adjustor gear train is self-locking, to maintain the selected one of the lane guide elements to which said selected one of the lane guide adjustor subassemblies is connected via said selected one of the drive elements in the predetermined position.

12. A lane adjustment system according to claim 11 in which said adjustor cross-members are arranged in vertically-arranged pairs thereof, each said pair comprising a lower one of the adjustor cross-members positioned below an upper one of the adjustor cross-members, each of the adjustor cross-members in the pair having a counter device at a first end thereof respectively, the first ends of the adjustor cross-members of the pair being located proximal to each other, at a selected first side of the conveyor.

13. A lane adjustment system according to claim 12 in which:
a selected first one of the worm gears is mounted on a first one of the drive elements, the first one of the worm gears being meshably engaged with a first one of the worms that is mounted on the upper one of the adjustor cross-members in the pair and included in a first one of the lane guide adjustor subassemblies located inside a first housing;
a second one of the worm gears is mounted on a second one of the drive elements, the second one of the worm gears being meshably engaged with a second one of the worms that is mounted on the lower one of the adjustor cross-members in the pair, and included in a second one of the lane guide adjustor assemblies located inside a second housing;
the upper and lower ones of the pair of adjustor cross-members extending through each of the first and second housings;
the first one of the lane guide adjustor subassemblies comprising first bushings located on the lower one of the adjustor cross-members of the pair, to facilitate rotation of the lower one of the adjustor cross-members of the pair relative to the first housing;
the second one of the lane guide adjustor subassemblies comprising second bushings located on the upper one of the adjustor cross-members of the pair, to facilitate rotation of the upper one of the adjustor cross-members of the pair relative to the second housing;
upon rotation of the upper one of the adjustor cross-members of the pair in a first direction about the axis thereof, such rotation urging the first housing to pivot in the first direction, the lower one of the adjustor cross-members of the pair resists pivoting motion of the first housing in the first direction, wherein the first bushings engage with the first housing; and
upon rotation of the lower one of the adjustor cross-members of the pair in a second direction about the axis thereof, such rotation urging the second housing to pivot in the second direction, the upper one of the adjustor cross-members of the pair resists pivoting motion of the second housing in the second direction, wherein the second bushings engage with the second housing.

14. A lane adjustment system according to claim 12 additionally comprising side plates in which the adjustor cross-members and selected ones of the point subassembly cross-members are mounted.

\* \* \* \* \*